(12) United States Patent
Zheng et al.

(10) Patent No.: US 10,906,032 B2
(45) Date of Patent: Feb. 2, 2021

(54) EXHAUST GAS TREATMENT CATALYSTS

(71) Applicants: BASF Corporation, Florham Park, NJ (US); N.E. Chemcat Corporation, Tokyo (JP)

(72) Inventors: Xiaolai Zheng, Princeton Junction, NJ (US); Michel Deeba, East Brunswick, NJ (US); Xiaofan Yang, Highland Park, NJ (US); Qi Fu, Solon, OH (US); Knut Wassermann, Princeton, NJ (US); Makoto Nagata, Numazu (JP); Yasuharu Kanno, Numazu (JP); Hiroki Nakayama, Numazu (JP)

(73) Assignees: BASF Corporation, Florham Park, NJ (US); N.E. Chemcat Corporation, Tokyo (JP)

( * ) Notice: Subject to any disclaimer, the term of this patent is extended or adjusted under 35 U.S.C. 154(b) by 0 days.

(21) Appl. No.: 15/752,968

(22) PCT Filed: Aug. 18, 2016

(86) PCT No.: PCT/US2016/047560
§ 371 (c)(1),
(2) Date: Feb. 15, 2018

(87) PCT Pub. No.: WO2017/034920
PCT Pub. Date: Mar. 2, 2017

(65) Prior Publication Data
US 2018/0229224 A1   Aug. 16, 2018

Related U.S. Application Data

(60) Provisional application No. 62/208,136, filed on Aug. 21, 2015.

(51) Int. Cl.
*B01J 29/85* (2006.01)
*B01J 29/76* (2006.01)
(Continued)

(52) U.S. Cl.
CPC ............ *B01J 29/85* (2013.01); *B01D 53/945* (2013.01); *B01D 53/9418* (2013.01); *B01D 53/9422* (2013.01); *B01D 53/9468* (2013.01); *B01D 53/9472* (2013.01); *B01D 53/9477* (2013.01); *B01J 21/066* (2013.01); *B01J 23/002* (2013.01); *B01J 23/10* (2013.01); *B01J 23/63* (2013.01); *B01J 23/745* (2013.01); *B01J 23/755* (2013.01); *B01J 23/83* (2013.01); *B01J 29/072* (2013.01); *B01J 29/76* (2013.01); *B01J 29/763* (2013.01); *B01J 35/0006* (2013.01); *B01J 35/04* (2013.01); *B01J 35/1014* (2013.01); *B01J 37/0201* (2013.01); *B01J 37/0236* (2013.01); *B01J 37/0244* (2013.01); *B01J 37/0246* (2013.01); *B01J 37/0248* (2013.01); *B01J 37/08* (2013.01); *B01J 37/088* (2013.01); *B01J 37/30* (2013.01); *F01N 3/101* (2013.01); *F01N 3/2066* (2013.01); *F01N 3/2828* (2013.01); *F01N 13/0093* (2014.06); *B01D 2255/2065* (2013.01); *B01D 2255/2066* (2013.01); *B01D 2255/2073* (2013.01); *B01D 2255/20715* (2013.01); *B01D 2255/20738* (2013.01); *B01D 2255/20746* (2013.01); *B01D 2255/20753* (2013.01); *B01D 2255/20761* (2013.01); *B01D 2255/407* (2013.01); *B01D 2255/50* (2013.01); *B01D 2255/9022* (2013.01); *B01D 2255/9032* (2013.01); *B01D 2255/9155* (2013.01);
(Continued)

(58) Field of Classification Search
CPC ............ B01D 53/9418; B01D 53/9431; B01D 53/9445; B01D 53/945; B01D 2255/207; B01D 2255/20761; B01D 2255/65; B01D 2255/902; B01D 2255/903; B01D 2255/904; B01D 2255/9155; B01D 2258/01; B01D 2258/012; F01N 3/0821; F01N 3/101; F01N 3/103; F01N 3/2066; F01N 3/28; F01N 2250/02
See application file for complete search history.

(56) References Cited

U.S. PATENT DOCUMENTS 8,226,896 B2 * 7/2012 Pfeifer ............... B01D 53/9468
422/171
8,685,352 B2    4/2014 Golden et al.
(Continued)

FOREIGN PATENT DOCUMENTS

EP      0 878 609      11/1998
EP      1 992 409      11/2008
WO   WO 2015/049110     4/2015

Primary Examiner — Timothy C Vanoy
(74) Attorney, Agent, or Firm — Womble Bond Dickinson (US) LLP

(57) ABSTRACT

Described are catalysts effective to abate $NO_x$, hydrocarbons, and carbon monoxide from a gasoline engine exhaust gas. Such catalysts include a substrate having a first and second material disposed thereon, the first material effective to catalyze selective catalytic reduction of nitrogen oxides in the presence of ammonia and the second material effective to abate hydrocarbons and carbon monoxide, the first material comprising a molecular sieve promoted with copper and/or iron in a low loading, the second material comprising at least one oxide of Ni, Fe, Mn, Co, and Cu on a support selected from oxides of Ce, Ce—Zr, Zr, Mn, Pr and combinations thereof. Also described are gasoline engine exhaust gas treatment systems and methods of treating exhaust gas from a gasoline engine.

38 Claims, 10 Drawing Sheets

(51) Int. Cl.
*B01J 23/755* (2006.01)
*B01J 23/10* (2006.01)
*B01J 23/745* (2006.01)
*B01J 21/06* (2006.01)
*B01J 35/00* (2006.01)
*B01J 35/04* (2006.01)
*B01J 37/30* (2006.01)
*B01J 37/08* (2006.01)
*B01J 37/02* (2006.01)
*B01D 53/94* (2006.01)
*F01N 3/20* (2006.01)
*F01N 3/28* (2006.01)
*F01N 3/10* (2006.01)
*F01N 13/00* (2010.01)
*B01J 23/00* (2006.01)
*B01J 23/63* (2006.01)
*B01J 23/83* (2006.01)
*B01J 35/10* (2006.01)
*B01J 29/072* (2006.01)

(52) U.S. Cl.
CPC ... *B01D 2258/014* (2013.01); *B01J 2229/183* (2013.01); *B01J 2229/186* (2013.01); *B01J 2523/00* (2013.01); *F01N 2330/06* (2013.01); *F01N 2610/02* (2013.01); *Y02T 10/22* (2013.01); *Y02T 10/24* (2013.01)

(56) References Cited

U.S. PATENT DOCUMENTS

| | | |
|---|---|---|
| 8,906,329 B2 | 12/2014 | Ballinger et al. |
| 2010/0254862 A1 | 10/2010 | Sato et al. |
| 2011/0047989 A1* | 3/2011 | Choung .............. F01N 3/106 60/297 |
| 2014/0161679 A1 | 6/2014 | Chiffey et al. |
| 2014/0219878 A1* | 8/2014 | Mccool .............. F01N 3/2066 422/168 |
| 2014/0227155 A1 | 8/2014 | Phillips et al. |
| 2014/0294706 A1 | 10/2014 | Stakheev et al. |
| 2016/0341091 A1* | 11/2016 | Theis ............... B01D 53/9477 |
| 2017/0087513 A1* | 3/2017 | Chandler .............. B01J 29/763 |
| 2017/0291140 A1* | 10/2017 | Schermanz .......... B01J 37/0246 |
| 2017/0333883 A1* | 11/2017 | Mohanan ............ B01D 53/8628 |
| 2018/0297016 A1* | 10/2018 | Blakeman .......... B01D 53/9418 |

* cited by examiner

EXHAUST GAS TREATMENT CATALYSTS

CROSS-REFERENCE TO RELATED APPLICATIONS

This application is a national stage filing under 35 U.S.C. 371 of International Patent Application No. PCT/US2016/047560, filed Aug. 18, 2016, which claims priority from U.S. Provisional Application No. 62/208,136, filed on Aug. 21, 2015. The disclosures of each of these applications are hereby incorporated by reference in their entireties.

TECHNICAL FIELD OF THE INVENTION

The present invention relates generally to the field of gasoline exhaust gas treatment catalysts.

BACKGROUND OF THE INVENTION

Exhaust gas from vehicles powered by gasoline engines is typically treated with one or more three-way conversion (TWC) automotive catalysts, which are effective to abate $NO_x$, carbon monoxide (CO), and hydrocarbon (HC) pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio is the stoichiometric ratio corresponding to the complete combustion of a hydrocarbon fuel, such as gasoline, to carbon dioxide ($CO_2$) and water. The symbol $\lambda$ is thus used to represent the result of dividing a particular A/F ratio by the stoichiometric A/F ratio for a given fuel, so that: $\lambda=1$ is a stoichiometric mixture, $\lambda>1$ is a fuel-lean mixture, and $\lambda<1$ is a fuel-rich mixture.

Gasoline engines having electronic fuel injection systems provide a constantly varying air-fuel mixture that quickly and continually cycles between lean and rich exhaust. Exhaust gas from vehicles powered by gasoline engines is typically treated with one or more TWC catalysts, which are effective to abate $NO_x$, carbon monoxide (CO), and hydrocarbon (HC) pollutants in the exhaust of engines operated at or near stoichiometric air/fuel conditions. A typical exhaust after-treatment system for a stoichiometric-burn gasoline engine consists of two three-way conversion (TWC) catalysts, a first/upstream TWC catalyst mounted in a position near the exhaust manifold and the engine compartment (the close-coupled position, CC), and a second/downstream TWC catalyst placed in a position either closely next to the first TWC catalyst (the second close-coupled position, CC2) or underneath the vehicle body (the underfloor position, UF). The first TWC catalyst is quickly heated up during cold start and provides the majority of conversions for pollutants including $NO_x$, HC and CO. The second TWC catalyst supplements the catalytic activities, particularly after light-off. Under rich conditions, in the presence of an excess of residual reductants and a deficiency of air, a fraction of $NO_x$ is over-reduced on the close-coupled TWC catalyst to generate ammonia passively.

Emission of nitrogen oxides ($NO_x$) must be reduced to meet emission regulation standards. TWC catalysts typically comprise a platinum group metal (PGM) supported on an oxygen storage component and/or a refractory metal oxide support, and, optionally, an additional platinum group metal component supported on a second refractory metal oxide support or a second oxygen storage component. TWC catalysts, however, are not effective for reducing $NO_x$ emissions when the gasoline engine runs lean because of excessive oxygen in the exhaust. Two of the most promising technologies for reducing $NO_x$ are urea selective catalytic reduction (SCR) and the lean $NO_x$ trap (LNT).

Urea SCR systems require a secondary fluid tank with an injection system, resulting in added system complexity. Other concerns for urea SCR include urea infrastructure, the potential freezing of urea solution, and the need for drivers to periodically fill the urea solution reservoir.

Gasoline engines offer significant potential for improving fuel efficiency and reducing $CO_2$ emissions. One of the exhaust architectures for gasoline applications is the passive $NH_3$-SCR system, which involves the use of an upstream catalyst to generate ammonia ($NH_3$) (during fuel-rich conditions) for use by a downstream $NH_3$-SCR for $NO_x$ reduction. There is a continuing need, from a performance and cost reduction point of view, to use a molecular sieve-based, passive $NH_3$-SCR catalyst to replace or downsize the conventional PGM-based second close-coupled or underfloor second TWC catalyst.

SUMMARY OF THE INVENTION

A first aspect of the present invention relates to a catalyst effective to abate $NO_x$, hydrocarbons, and carbon monoxide from a stoichiometric gasoline engine exhaust gas. In a first embodiment, the catalyst comprises a substrate having a first and second material disposed thereon, wherein the first material is effective to catalyze selective catalytic reduction of nitrogen oxides in the presence of ammonia and the second material is effective to abate hydrocarbons and carbon monoxide; wherein the first material comprises a molecular sieve promoted with copper or iron in an amount of about 0.01% to about 2% on an oxide basis by weight based on the weight of the molecular sieve and/or the second material comprises at least one oxide of a metal selected from Ni, Fe, Mn, Co, and Cu on a support selected from an oxide of Ce, Ce—Zr, Zr, Mn, Pr and combinations thereof, and wherein the first material and the second material are free substantially of a platinum group metal.

In a second embodiment, the catalyst of the first embodiment is modified, wherein the substrate is a honeycomb substrate and wherein the first material and second material are mixed in a single layer on the substrate.

In a third embodiment, the catalyst of the first embodiment is modified, wherein the first material is in a first layer and the second material is in a second layer on the substrate.

In a fourth embodiment, the catalyst of the third embodiment is modified, wherein the substrate has an axial length and an upstream end and a downstream end, and wherein the first layer is disposed on the upstream end and the second layer is disposed on the downstream end.

In a fifth embodiment, the catalyst of the third embodiment is modified, wherein the substrate has an axial length and an upstream end and a downstream end, wherein the first layer is disposed on the downstream end and the second layer is disposed on the upstream end.

In a sixth embodiment, the catalyst of the third embodiment is modified, wherein the first layer is directly on the substrate and the second layer at least partially overlies the first layer.

In a seventh embodiment, the catalyst of the third embodiment is modified, wherein the second layer is directly on the substrate and the first layer at least partially overlies the second layer.

In an eighth embodiment, the catalyst of the first embodiment is modified, wherein the substrate is a wall flow filter having inlet passages and outlet passages.

In a ninth embodiment, the catalyst of the eighth embodiment is modified, wherein the first material is disposed on the inlet passages and the second material is disposed on the outlet passages.

In a tenth embodiment, the catalyst of the eighth embodiment is modified, wherein the second material is disposed on the inlet passages and the first material is disposed on the outlet passages.

In an eleventh embodiment, the catalyst of the first embodiment is modified, wherein the molecular sieve is a small pore molecular sieve having a maximum ring size of eight tetrahedral atoms and a double six-ring (d6r) unit.

In a twelfth embodiment, the catalyst of the first embodiment is modified, wherein the molecular sieve is selected from the group consisting of framework types AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In a thirteenth embodiment, the catalyst of the first embodiment is modified, wherein the molecular sieve is selected from the group consisting of framework types CHA, AEI, AFX, ERI, KFI, and LEV.

In a fourteenth embodiment, the catalyst of the first embodiment is modified, wherein the molecular sieve is selected from the group consisting of framework types AEI, CHA, and AFX.

In a fifteenth embodiment, the catalyst of the first embodiment is modified, wherein the molecular sieve comprises a molecular sieve of framework type CHA.

In a sixteenth embodiment, the catalyst of the fifteenth embodiment is modified, wherein the molecular sieve is selected from SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, and Ti-SAPO-34.

In a seventeenth embodiment, the catalyst of the sixteenth embodiment is modified, wherein the molecular sieve is SSZ-13 having a molar ratio of silica to alumina of about 10 to about 75.

In an eighteenth embodiment, the catalyst of the sixteenth embodiment is modified, wherein the molecular sieve is promoted with less than about 2% copper by weight on an oxide basis based on the weight of the metal-promoted molecular sieve.

In a nineteenth embodiment, the catalyst of the sixteenth embodiment is modified, wherein the molecular sieve is promoted with copper in the range of about 0.5 to about 2% by weight on an oxide basis based on the weight of the metal-promoted molecular sieve, and wherein in a FTP driving cycle, the catalyst is effective to convert at least about 30% of nitrogen oxides in the exhaust gas by selective catalytic reduction of nitrogen oxides in the presence of ammonia at temperatures in excess of 850° C. for more than ten hours.

In a twentieth embodiment, the catalyst of the first embodiment is modified, wherein the second material comprises at least one oxide of a metal selected from Ni, Fe, Mn, Co, and Cu.

In a twenty-first embodiment, the catalyst of the first embodiment is modified, wherein the second material comprises an oxide of Ni.

In a twenty-second embodiment, the catalyst of the first embodiment is modified, wherein the second material comprises an oxide of Ni deposited on a support comprising an oxide of Ce.

In twenty-third embodiment, the catalyst of the eighteenth embodiment is modified, wherein the second material comprises an oxide of Ni on a support comprising an oxide of Ce.

In a twenty-fourth embodiment, the catalyst of the twenty-third embodiment is modified, wherein the first material is in a first layer and the second material is in a second layer, wherein the first layer and the second layer are disposed on a substrate in a zoned configuration, and wherein the first layer overlies the second layer.

In a twenty-fifth embodiment, the catalyst of the first embodiment is modified, wherein the at least one oxide of a metal selected from Ni, Fe, Mn, Co, and Cu is present in an amount of about 0.1 to about 30 wt. %, on an oxide basis based on the weight of the support.

In a twenty-sixth embodiment, the catalyst of the twenty-fifth embodiment is modified, wherein the at least one oxide of a metal selected from Ni, Fe, Mn, Co, and Cu is present in an amount of about 2 to about 10 wt. %, on an oxide basis based on the weight of the support.

A second aspect of the present invention is directed to an exhaust gas treatment system. In a twenty-seventh embodiment, an exhaust gas treatment system comprises: a stoichiometric gasoline engine; a three-way conversion (TWC) catalyst downstream from the engine, wherein the TWC catalyst is effective to convert carbon monoxide, hydrocarbons and oxides of nitrogen, and wherein the TWC catalyst comprises at least one platinum group metal selected from platinum, palladium and rhodium; and the catalyst of the first through twenty-sixth embodiments is located downstream from the three-way conversion catalyst.

In a twenty-eighth embodiment, the exhaust gas treatment system of the twenty-seventh embodiment is modified, wherein the TWC catalyst is located in a first close-coupled position downstream of the engine and the catalyst of the first embodiment is located in a second close-coupled position immediately downstream of the TWC catalyst.

In a twenty-ninth embodiment, the exhaust gas treatment system of the twenty-seventh embodiment is modified, wherein the TWC catalyst is located in a first close-coupled position downstream of the engine and the catalyst of the first embodiment is located in an underfloor position downstream of the TWC catalyst.

In a thirtieth embodiment, the exhaust gas treatment system of the twenty-seventh embodiment is modified, wherein the catalyst of the first embodiment is exposed to a lean and rich exhaust gas having a temperature in excess of 800° C.

A third aspect of the present invention is directed to an exhaust gas treatment system. In a thirty-first embodiment, an exhaust gas treatment system of the twenty-seventh embodiment comprises: a stoichiometric gasoline engine; a selective catalytic reduction (SCR) catalyst downstream from the engine, the SCR catalyst comprising copper and a second molecular sieve having a maximum ring size of eight tetrahedral atoms and a double six-ring (d6r) unit, wherein the copper is present in an amount about 0.01% to about 2% by weight on an oxide basis based on the weight of the metal-promoted second molecular sieve, wherein the SCR effective to catalyze the selective catalytic reduction of nitrogen oxides in the presence of ammonia under stoichiometric engine operating conditions.

In a thirty-second embodiment, the exhaust gas treatment system of the thirty-first embodiment is modified, wherein the second molecular sieve comprises a molecular sieve of framework type CHA.

In a thirty-third embodiment, the exhaust gas treatment system of the thirty-first embodiments is modified, wherein the second molecular sieve is selected from SSZ-13, SSZ-62, chabazite, zeolite K-G, Linde D, Linde R, LZ-218, LZ-235, LZ-236, ZK-14, SAPO-34, SAPO-44, SAPO-47, ZYT-6, and Ti-SAPO-34.

In a thirty-fourth embodiment, the exhaust gas treatment system of the thirty-third embodiment is modified, wherein the second molecular sieve is SSZ-13 having a molar ratio of silica to alumina of about 10 to about 75.

In a thirty-fifth embodiment, the exhaust gas treatment system of the thirty-first embodiment is modified, wherein the exhaust gas has a temperature of at least 850° C.

In a thirty-sixth embodiment, the exhaust gas treatment system of the thirty-first embodiment is modified, wherein the molecular sieve has a surface area greater than 400 m$^2$/g after exposure to an exhaust gas having a temperature of about 850° C. for 2 hours.

In a thirty-seventh embodiment, the exhaust gas treatment system of the thirty-fifth embodiment is modified, wherein the molecular sieve has an aged surface area after exposure to the exhaust gas of about 75% of a fresh surface area, wherein the fresh surface area of the molecular sieve prior to exposure to the exhaust gas.

In thirty-eighth embodiment, the exhaust gas treatment system of the thirty-first embodiment is modified, wherein the at least one oxide of a metal selected from Ni, Fe, Mn, Co, and Cu is present in an amount of about 0.1 to about 30 wt. %, on an oxide basis based on the weight of the support.

In a thirty-ninth embodiment, the exhaust gas treatment system of the thirty-eighth embodiments is modified, wherein at least one oxide of a metal selected from Ni, Fe, Mn, Co, and Cu is present in an amount of about 2 to about 10 wt. %, on an oxide basis based on the weight of the support.

A fourth aspect of the present invention is directed to a method for treating exhaust gas from stoichiometric gasoline engines. In a fortieth embodiment, a method of treating exhaust gas from a stoichiometric gasoline engine comprises a three-way catalyst (TWC) catalyst effective to convert carbon monoxide, hydrocarbons and oxides of nitrogen, wherein the TWC catalyst contains at least one platinum group metal selected from platinum, palladium and rhodium and the catalyst first through the twenty-sixth embodiment, wherein the catalyst is located downstream from a stoichiometric gasoline engine and the TWC catalyst.

DETAILED DESCRIPTION OF THE INVENTION

Figure 1:
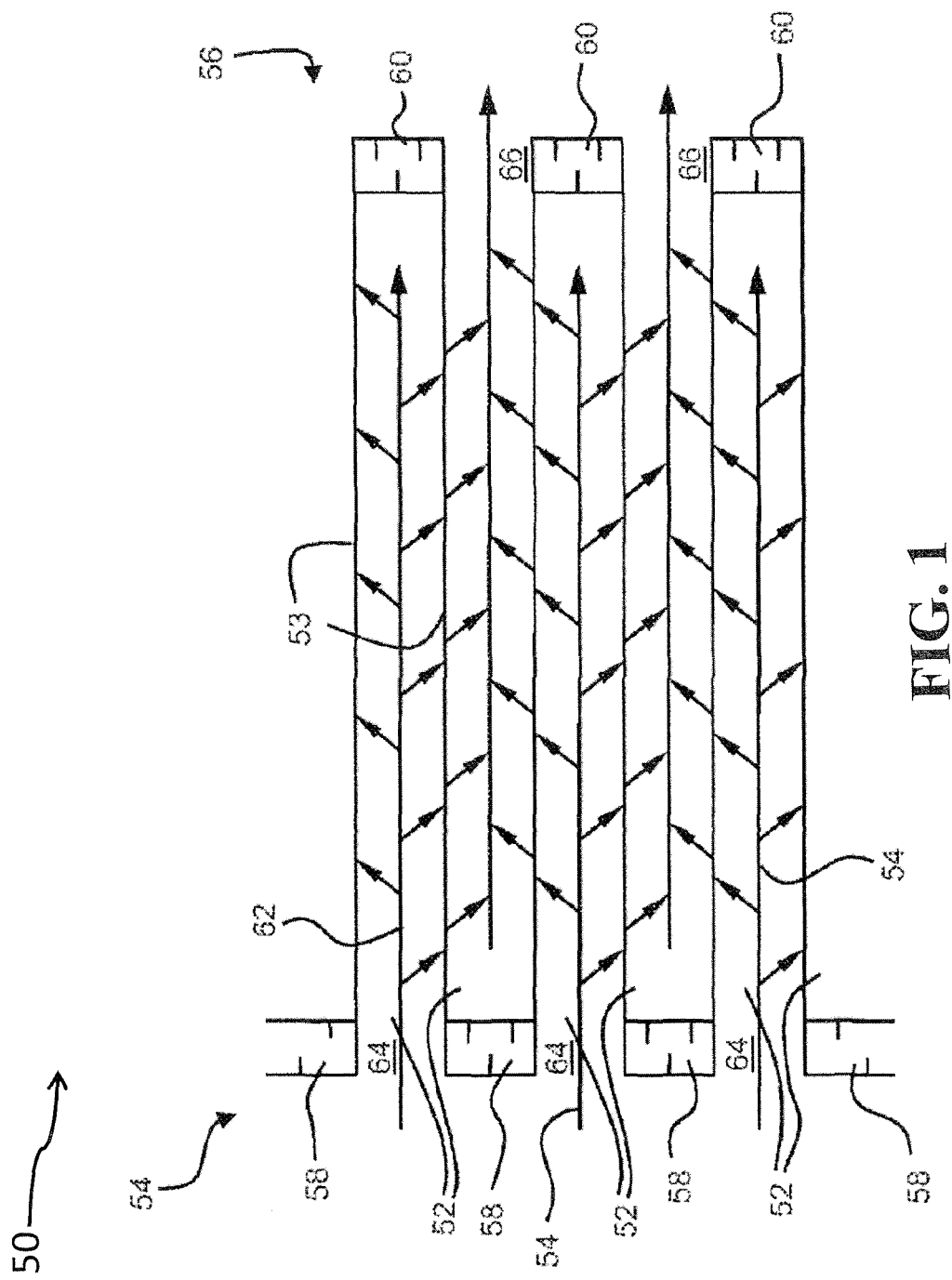
FIG. 1 shows a cross-sectional view of a section of a wall flow filter substrate.

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to catalysts effective to abate NO$_x$, hydrocarbons and carbon monoxide from a stoichiometric gasoline engine exhaust gas. The integration of a SCR catalyst into a TWC system is thought to improve tailpipe NO$_x$ performance and reduce NH$_3$ as a secondary emission. Copper and/or iron exchanged molecular sieves, however, with a CuO and/or Fe$_2$O$_3$ loading of 2 to 4%, are not stable under lean/rich aging conditions. Without intending to be bound by theory, it is thought that the instability of the high Cu- and/or Fe-loaded SCR component is due to the proximity of Cu(II) and/or Fe(III) cations in the zeolitic micropores, which are subjected to reduction to form metallic Cu and/or metallic Fe nanoparticles under rich aging conditions at a high temperature. Under lean conditions, those metallic Cu and/or metallic Fe species are oxidized to CuO and/or Fe$_2$O$_3$ in an agglomerated form instead of site-isolated Cu and/or Fe cations. As a result, the zeolitic structure continuously loses Cu and/or Fe cation species and eventually collapses. Surprisingly, it was found that catalysts comprising a relatively low Cu and/or Fe loading display a higher thermal stability under lean/rich aging, particularly at high temperatures (e.g., 850° C.).

Thus, according to embodiments of a first aspect of the invention, provided is a catalyst effective to abate NO$_x$, hydrocarbons and carbon monoxide from a stoichiometric gasoline engine exhaust gas, the catalyst comprising a substrate having a first and second material disposed thereon, the first material effective to catalyze selective catalytic reduction of nitrogen oxides in the presence of ammonia and the second material effective to abate hydrocarbons and carbon monoxide, the first material comprising a molecular sieve promoted with copper and/or iron in a relatively low loading amount on an oxide basis by weight based on the weight of the first material, the second material comprising at least one oxide of Ni, Fe, Mn, Co, and Cu on a support selected from an oxide of Ce, Ce—Zr, Zr, Mn, Pr and combinations thereof, wherein the catalyst is free of a platinum group metal.

With respect to the terms used in this disclosure, the following definitions are provided. As used in this specification and the appended claims, the singular forms "a," "an," and "the" include plural referents unless the context clearly indicates otherwise. Thus, for example, reference to "a catalyst" includes a mixture of two or more catalysts, and the like.

As used herein, the term "abate" means to decrease in amount and "abatement" means a decrease in the amount, caused by any means.

As used herein, the term "substantially free of a platinum group metal" means that there is no additional platinum group metal intentionally added to the catalyst containing the first and second material, and, in some embodiments there is less than about 0.01 wt. % of any additional platinum group metal by weight present in the catalyst composition. In some embodiments, "substantially free of platinum group metal" includes "free of platinum group metal."

As used herein, the terms "catalyst" or "catalyst material" or "catalytic material" refer to a material that promotes a reaction.

As used herein, the term "catalytic article" refers to an element that is used to promote a desired reaction. For example, a catalytic article may comprise a washcoat containing a catalytic species, e.g. a catalyst composition, on a substrate, for example, a honeycomb substrate.

As used herein, the terms "layer" and "layered" refer to a structure that is supported on a surface, e.g. a substrate.

As used herein, the term "gasoline engine" refers to any internal combustion engine with spark-ignition designed to run on gasoline. Recently, to improve fuel-economy, gasoline-fueled engines are being designed to operate under lean conditions. Lean conditions refers to maintaining the ratio of air to fuel in the combustion mixtures supplied to such engines above the stoichiometric ratio so that the resulting exhaust gases are "lean," i.e., the exhaust gases are relatively high in oxygen content. Lean burn gasoline direct injection (GDI) engines offer fuel efficiency benefits that can contribute to a reduction in greenhouse gas emissions carrying out fuel combustion in excess air. GDI engines can have lean burn conditions and stratified combustion resulting in the generation of particulates. In contrast to particulates generated by diesel lean burn engines, the particulates generated by GDI engines tend to be finer and in lesser quantities. In one or more embodiments, the engine is selected from a stoichiometric gasoline engine or a lean gasoline direct injection engine. In other specific embodiments, the gasoline engine is a stoichiometric gasoline engine.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the term "stream" broadly refers to any combination of flowing gas that may contain solid or liquid particulate matter. The term "gaseous stream" or "exhaust gas stream" means a stream of gaseous constituents, such as the exhaust of an engine, which may contain entrained non-gaseous components such as liquid droplets, solid particulates, and the like. The exhaust gas stream of an engine typically further comprises combustion products, products of incomplete combustion, oxides of nitrogen, combustible and/or carbonaceous particulate matter (soot), and un-reacted oxygen and nitrogen.

First Material

In one or more embodiments, a catalyst effective to abate $NO_x$, hydrocarbons and carbon monoxide from a stoichiometric gasoline engine exhaust gas comprises a substrate having a first and second material disposed thereon, the first material effective to catalyze selective catalytic reduction of nitrogen oxides in the presence of ammonia.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

The SCR process uses catalytic reduction of nitrogen oxides with ammonia to form nitrogen and water:

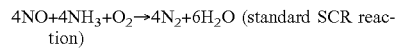 (standard SCR reaction)

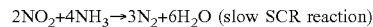 (slow SCR reaction)

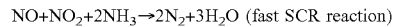 (fast SCR reaction)

Catalysts employed in the SCR process ideally should be able to retain good catalytic activity over the wide range of temperature conditions of use, for example, about 200° C. to about 600° C. or higher, under hydrothermal conditions. Hydrothermal conditions are often encountered in practice, such as during the regeneration of a soot filter, a component of the exhaust gas treatment system used for the removal of particles.

In one or more embodiments, within the FTP driving cycle, the catalyst of one or more embodiments including the first material and the second material is effective to convert at least about 30% of nitrogen oxides in the exhaust gas by selective catalytic reduction of nitrogen oxides in the presence of ammonia after exposure to fuel cut engine aging conditions at a temperature of about 850° C. for more than 10 hours.

As used herein, the term "Federal Testing Procedure (FTP) driving cycle" refers to the set of vehicle speed points versus time created by the United States to represent a commuting cycle with a part of urban driving including frequent stops and a part of highway driving. The FTP driving cycle is sometimes used to assess fuel consumption and pollutants of a vehicle in a normalized way, so that different vehicles can be compared. The driving cycle may be performed on a chassis dynamometer, where tailpipe emissions of a vehicle are collected and analyzed to assess emissions rates. The FTP driving cycle is a transient cycle which involves many speed variations, typical of on-road driving conditions.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotypic framework materials such as SAPO, ALPO and MeAPO materials having the same framework type as the zeolite materials.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g. zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the molecular sieve, independently, comprises $SiO_4/AlO_4$ tetrahedra that are linked by common oxygen atoms to form a three-dimensional network. In other embodiments, the molecular sieve comprises $SiO_4/AlO_4/PO_4$ tetrahedra. The molecular sieve of one or more embodiments can be differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 12, including 6, 8, 10, and 12.

According to one or more embodiments, the molecular sieve can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DET, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve comprises an 8-ring small pore aluminosilicate zeolite. As used herein, the term "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. In one or more embodiments, the molecular sieve is a small pore molecular sieve having a maximum ring size of eight tetrahedral atoms.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve comprises a d6r unit. Thus, in one or more embodiments, the molecular sieve has a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular sieve has a framework type selected from the group consisting of CHA, AEI, AFX, ERI, KFI, LEV, and combinations thereof. In still further specific embodiments, the molecular sieve has a framework type selected from CHA, AEI, and AFX. In one or more very specific embodiments, the molecular sieve has the CHA framework type.

Zeolitic CHA-framework type molecular sieves include a naturally occurring tectosilicate mineral of a zeolite group with approximate formula: $(Ca,Na_2,K_2,Mg)Al_2Si4O_{12}.6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868, 846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. Synthesis of a synthetic form of a molecular sieve having the CHA framework type, silicoaluminophosphate 34 (SAPO-34), is described in U.S. Pat. Nos. 4,440,871 and 7,264,789, which are hereby incorporated by reference. A method of making yet another synthetic molecular sieve having the CHA framework type, SAPO-44, is described in U.S. Pat. No. 6,162,415, which is hereby incorporated by reference.

In one or more embodiments, the molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, Ti-SAPO-34, and CuSAPO-47. The ratio of silica to alumina of an aluminosilicate molecular sieve can vary over a wide range. In one or more embodiments, the molecular sieve has a silica to alumina molar ratio (SAR) in the range of about 2 to about 300, including about 5 to about 250; about 5 to about 200; about 5 to about 100; and about 5 to about 50. In one or more specific embodiments, the molecular sieve has a silica to alumina molar ratio (SAR) in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50.

As used herein, the term "promoted" refers to a component that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the selective catalytic reduction of nitrogen oxides in the presence of ammonia, in one or more embodiments, a suitable metal(s) is independently exchanged into the molecular sieve. According to one or more embodiments, the molecular sieve is promoted with copper (Cu) and/or iron (Fe). In specific embodiments, the molecular sieve is promoted with copper (Cu). In other embodiments, the molecular sieve is promoted with copper (Cu) and iron (Fe). In still further embodiments, the molecular sieve is promoted with iron (Fe).

Surprisingly, it was found that low promoter metal content leads to catalysts that are highly stable under lean/rich aging conditions at temperatures of 800° C. and above, particularly 850° C. and above. In one or more embodiments, the promoter metal content of the catalyst, calculated as the oxide, is up to about 2 wt. %, based on the weight of the molecular sieve. In specific embodiments, the promoter metal content, calculated as the oxide, is in the range of about 0.01 wt. % up to about 2 wt. %, including in the range of about 0.01 to about 2%, about 0.01 to about 1.5%, about 0.01 to about 1%, about 0.5 to about 2%, about 0.1 to about 2 wt. %, about 0.1 to about 1.5 wt. %, and about 0.1 to about 1 wt. %, in each case based on the weight of the metal-promoted molecular sieve. In one or more embodiments, the promoter metal content is reported on a volatile free basis.

Accordingly, in one or more specific embodiments, the catalyst comprises a first material effective to catalyze selective catalytic reduction of nitrogen oxides in the presence of ammonia, the first material comprising a molecular sieve promoted with copper and/or iron in an amount ranging from about 0.01% to about 2% on an oxide basis, based on the weight of the molecular sieve. In specific embodiments, the promoter metal comprises Cu, and the Cu content, calculated as CuO, is less than about 2%, based on the weight of the metal-promoted molecular sieve.

Second Material

In one or more embodiments, a catalyst effective to abate $NO_x$, hydrocarbons and carbon monoxide from a stoichiometric gasoline engine exhaust gas comprises a substrate having a first and second material disposed thereon, the second material effective to abate hydrocarbons and carbon monoxide.

In one or more embodiments, the second material comprises at least one base metal oxide on a support. As used herein, the term "base metal" refers generally to a metal that oxidizes or corrodes relatively easily when exposed to air and moisture. In one or more embodiments, the base metal comprises one or more base metal oxides selected from vanadium (V), tungsten (W), titanium (Ti), copper (Cu), iron (Fe), cobalt (Co), nickel (Ni), chromium (Cr), manganese (Mn), neodymium (Nd), barium (Ba), cerium (Ce), lanthanum (La), praseodymium (Pr), magnesium (Mg), calcium (Ca), zinc (Zn), niobium (Nb), zirconium (Zr), molybdenum (Mo), tin (Sn), tantalum (Ta), cerium (Ce), and strontium (Sr), or combinations thereof. In a specific embodiment, the second material comprises at least one oxide of nickel (Ni), iron (Fe), manganese (Mn), cobalt (Co), and copper (Cu). In other specific embodiments, the second material comprises at least one oxide of nickel (Ni), iron (Fe), and copper (Cu). In a very specific embodiment, the second material comprises an oxide of nickel (Ni).

Generally there are no particular restrictions with respect to the amount of base metal oxide used in the second material. In one or more embodiments, the amount of base metal oxide present is about 0.1 to about 30 wt. %, including about 1 to about 20 wt. %, and about 2 to about 10 wt. %, on an oxide basis based on the weight of the support. In one or more embodiments, the amount of base metal oxide is reported on a volatile free basis. In other embodiments, the amount of Ni, Fe, Mn, Co, or Cu oxide is about 0.1 to about 30 wt. %, including about 1 to about 20 wt. %, and about 2 to about 10 wt. %, in each case on an oxide basis based on the weight of the support. In one or more embodiments, the second material comprises from about 1 to 20 wt. % of at least one metal oxide of a metal selected from nickel (Ni), iron (Fe), and copper (Cu), on an oxide basis based on the weight of the support. In specific embodiments, the second material comprises from about 2 to 10 wt. % of at least one metal oxide of a metal selected from nickel (Ni), iron (Fe), and copper (Cu). In each case the wt. % is on an oxide basis based on the weight of the metal-containing support. In one or more specific embodiments, the second material comprises an oxide of Ni, and the oxide of Ni is present in an amount of about 0.1 to 30 wt. %, including about 1 to 20 wt. %, and about 2 to 10 wt. %, on an oxide basis based on the weight of the support.

As used herein, the terms "refractory metal oxide support" and "support" refer to the underlying high surface area material upon which additional chemical compounds or elements are carried. The support particles have pores larger than 20 Å and a wide pore distribution. As defined herein, such refractory metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

As used herein, the term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions. Examples of oxygen storage components include rare earth oxides, particularly ceria, lanthana, praseodymia, neodymia, niobia, europia, samaria, ytterbia, yttria, zirconia, and mixtures thereof in addition to ceria.

In one or more embodiments, the second material comprises a support selected from an oxide of cerium (Ce), cerium-zirconium (CeZr), manganese (Mn), praseodymium (Pr), and combinations thereof. In one or more specific embodiments, the support comprises an oxide of ceria (Ce).

Thus, in one or more specific embodiments, the second material comprises from about 0.1 to 30 wt. %, including about 1 to 20 wt. %, and about 2 to 10 wt. % of at least one oxide of nickel (Ni), iron (Fe), and copper (Cu) and the support comprises an oxide of ceria (Ce); in each case the wt. % is on an oxide basis based on the weight of the ceria support. In one or more specific embodiments, the second material comprises an oxide of Ni, the support comprises an oxide of ceria (Ce), and the oxide of Ni is present in an amount in the range of about 0.1 to 30 wt. %, including about 1 to 20 wt. %, and about 2 to 10 wt. %, on an oxide basis based on the weight of the ceria support.

As used herein, the term "platinum group metal" or "PGM" refers to one or more chemical elements defined in the Periodic Table of Elements, including platinum (Pt), palladium, rhodium, osmium, iridium, and ruthenium, and mixtures thereof.

As used herein, "platinum group metal component," "platinum component," "rhodium component," "palladium component, "iridium component" and the like refers the respective platinum group metal compound, complex, or the like which, upon calcination or use of the catalyst decomposes or otherwise converts to a catalytically active form, usually, the metal or the metal oxide.

According to one or more embodiments, the first material and the second material are substantially free of a platinum group metal. As used herein, the terms "substantially free of platinum group metal" or "free of platinum group metal" means that no platinum group metal has been intentionally added to the first material or the second material, and that there is generally less than about 1000 ppm, including less than about 100 ppm, less than about 10 ppm, or less than about 1 ppm of platinum group metal in the first material and the second material. It will be appreciated by one of skill in the art, however that during loading/coating, trace amounts of platinum group metal may migrate from one washcoat component to another, such that trace amounts of platinum group metal can be present in the first material and/or the second material. In one or more embodiments, the catalyst comprising the substrate having the first material and second material coated thereon is substantially free of platinum group metal.

Substrate

In one or more embodiments, the first and second materials of the catalyst are disposed on a substrate. As used herein, the term "substrate" refers to the monolithic material onto which the catalyst material is placed, typically in the form of a washcoat. A washcoat is formed by preparing a slurry containing a specified solids content (e.g., 30-90% by weight) of catalyst in a liquid, which is then coated onto a substrate and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is selected from one or more of a flow-through honeycomb monolith or a particulate filter, and the catalytic material(s) are applied to the substrate as a washcoat.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

A ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like. Substrates useful for the catalyst of embodiments of the present invention may also be metallic in nature and be composed of one or more metals or metal alloys. A metallic substrate may include any metallic substrate, such as those with openings or "punch-outs" in the channel walls. Metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel, in each case based on the weight of the substrate.

In one or more embodiments in which the substrate is a particulate filter, the particulate filter can be selected from a gasoline particulate filter or a soot filter. As used herein, the terms "particulate filter" or "soot filter" refer to a filter designed to remove particulate matter from an exhaust gas stream such as soot. Particulate filters include, but are not limited to honeycomb wall flow filters, partial filtration filters, wire mesh filters, wound fiber filters, sintered metal filters, and foam filters.

In a specific embodiment, the particulate filter is a catalyzed soot filter (CSF). The catalyzed CSF comprises a substrate coated with a washcoat layer containing a platinum group metal for burning off trapped soot and/or oxidizing NO to $NO_2$. The catalyzed CSF is coated with a platinum group metal and one or more high surface area refractory metal oxide supports (e.g., alumina, silica, silica alumina, zirconia, zirconia alumina, and ceria-zirconia) for the combustion of unburned hydrocarbons and, to some degree, particulate matter.

Wall flow substrates useful for supporting the catalyst material of one or more embodiments have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein a platinum group metal. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

FIG. 1 illustrates a wall flow filter substrate 50 which has a plurality of passages 52. The passages are tubularly enclosed by the channel walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet end 54 and outlet end 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

In one or more embodiments, the first and second materials of the catalyst are disposed on a substrate. For example, in such embodiments, the catalyst can be disposed on a flow through substrate. In other embodiments, the catalyst can be disposed on a wall flow filter (i.e. SCR on a filter). In still further embodiments, the catalyst can be disposed on a particulate filter.

In one or more embodiments, the first material and the second material are mixed in a layer on the substrate. In one or more embodiments, the mixture is a homogeneous mixture. As used herein, the terms "homogeneously mixed" or "homogeneous mixture" refer to a washcoat mixture wherein the first material and the second material are uniformly distributed throughout the washcoat such that the washcoat is the same throughout.

Figure 2:
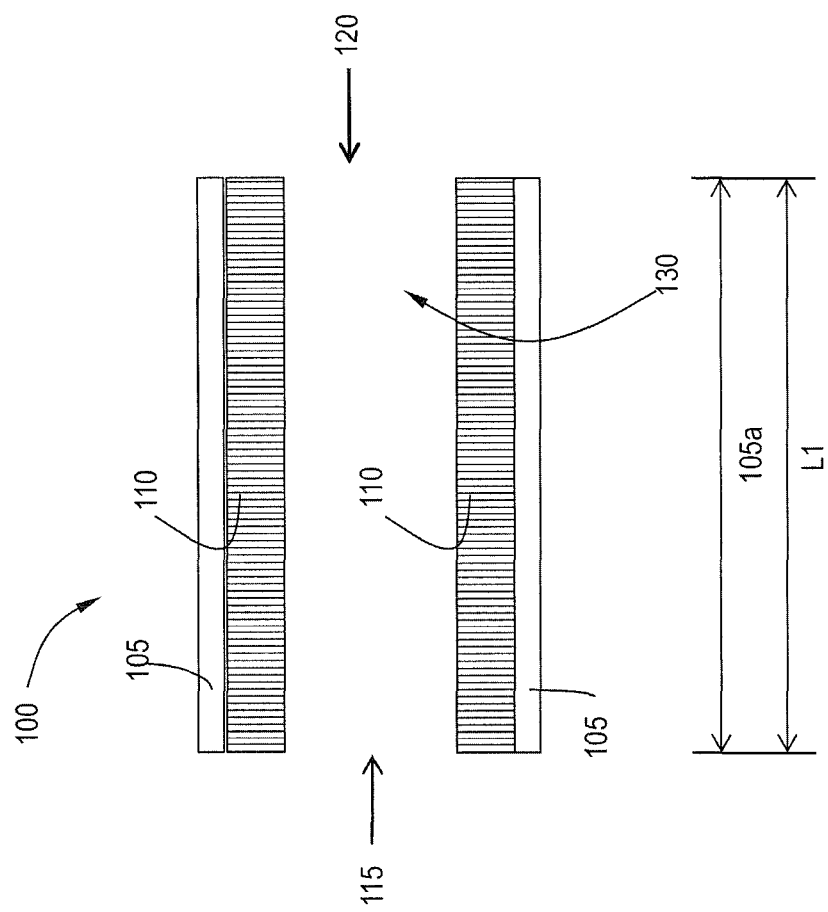
FIG. 2 shows a partial cross-sectional view of catalytic article systems according to one or more embodiments.

On a substrate, the designs can include zoned and layered systems. Embodiments where the first material and the second material are mixed in a single layer on the substrate are more specifically illustrated in FIG. 2. Referring to FIG. 2, a layered catalyst 100 shown is where the first material and the second material are mixed in a single layer 110 and deposited on a substrate 105. The substrate 105 has an inlet end 115 and an outlet end 120 defining an axial length L1. In one or more embodiments, the substrate 105 generally comprises a plurality of channels 130 of a honeycomb substrate, of which only one channel is shown in cross-section for clarity. The first material and the second material are mixed in a single layer 110 that extends from the inlet end 115 of the substrate 105 through the entire axial length L1 of the substrate 105 to the outlet end 120. The length of the first material and the second material mixed in a single layer 110 is denoted as length 105*a* in FIG. 2.

Figure 3:
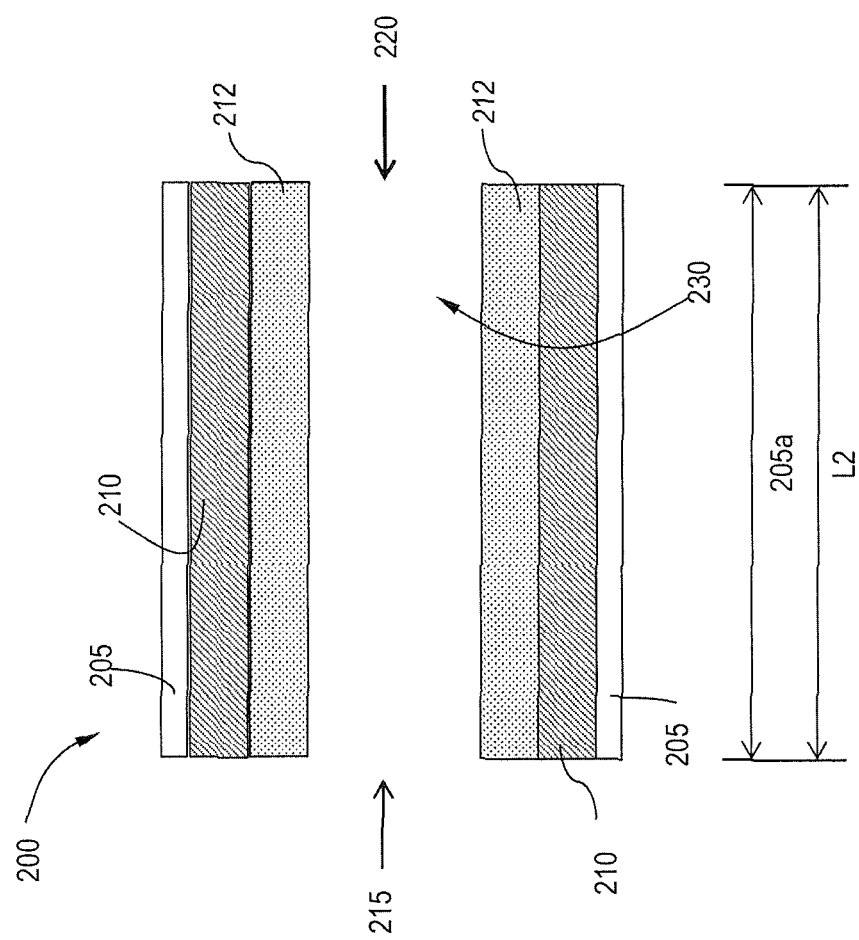
FIG. 3 shows partial cross-sectional views of catalytic article systems according to one or more embodiments.

In other embodiments, the first material may be disposed as a layer on the substrate, and the second material may be disposed as a layer on top of the first layer. In still further embodiments, the second material may be disposed as a layer on the substrate, and the first material may be disposed as a layer on top of the second material. Embodiments where the first material and the second material are disposed on the substrate in two layers are more specifically illustrated in FIG. 3. Referring to FIG. 3, a layered catalyst 200 shown is where the first material is disposed as a first layer 210 on a substrate 205. The second material is disposed as a second layer 212 on top of the first layer 210. The substrate 205 has an inlet end 215 and an outlet end 220 defining an axial length L2. In one or more embodiments, the substrate 205 generally comprises a plurality of channels 230 of a honeycomb substrate, of which only one channel is shown in cross-section for clarity. The first layer 210 and the second layer 212 extend from the inlet end 215 of the substrate 205 through the entire axial length L2 of the substrate 205 to the outlet end 220. The length of the first layer 210 and the second layer 212 is denoted as length 205*a* in FIG. 3. It will be appreciated by one of skill in the art that in some embodiments, the location of the first material and the second material can be reversed, such that the second material forms a first layer on the substrate and the first material forms a second layer disposed on top of the first layer.

In one or more embodiments, the first material and the second material of the catalyst are arranged in an axially zoned configuration on a substrate. As used herein, the term "axially zoned" refers to the location of the upstream zone and downstream zone relative to one another. Axially means side-by-side such that the upstream zone and the downstream zone are located one beside the other. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. When a catalyst or catalyst zone is "downstream" or "upstream" from another catalyst or zone, it may be on a different substrate or brick or on a different region of the same substrate or brick. Such embodiments may be more readily understood with reference to FIGS. 4-7.

Figure 4:
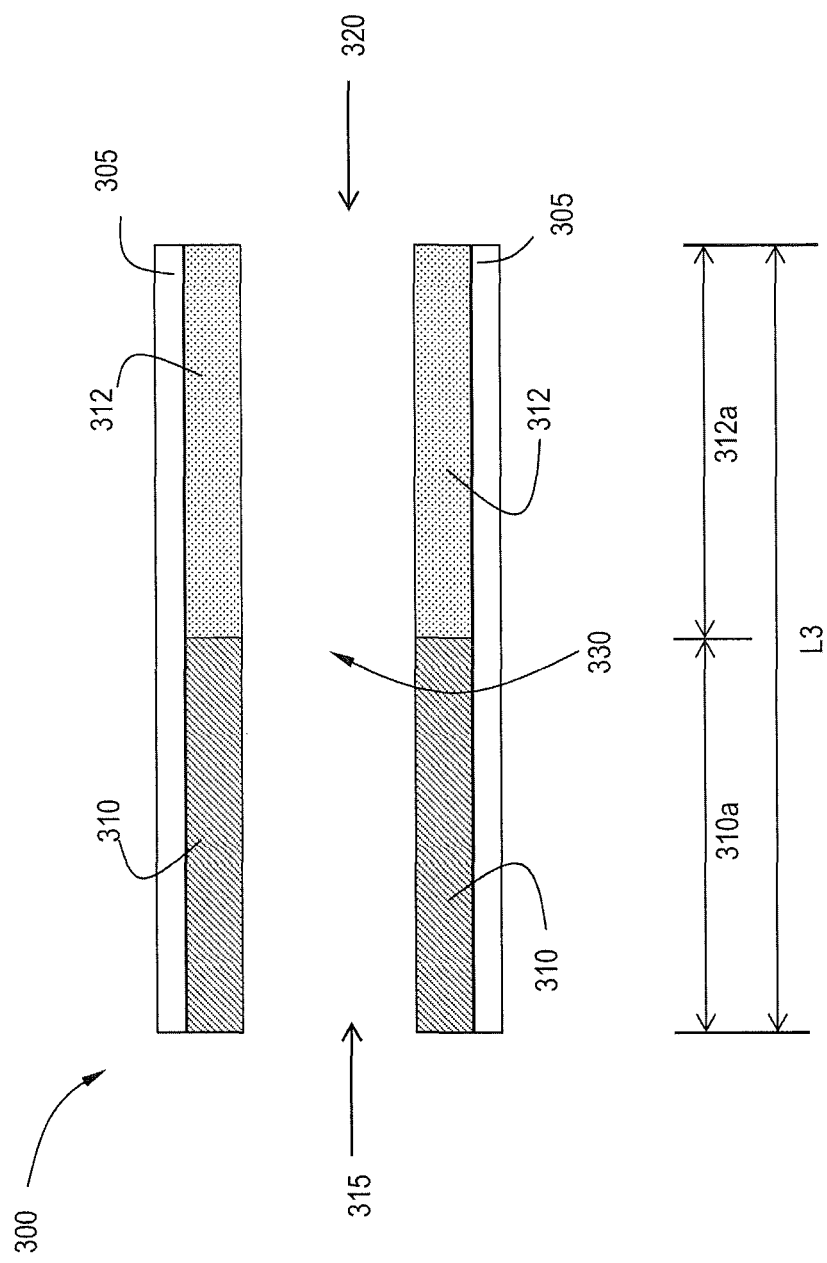
FIG. 4 shows partial cross-sectional views of catalytic article systems according to one or more embodiments.

Referring to FIG. 4, an exemplary embodiment of an axially zoned catalyst 300 is shown. The first material forms an upstream zone 310, which is located upstream of the second material which forms a downstream zone 312 on a common substrate 305. The substrate 305 has an inlet end 315 and an outlet end 320 defining an axial length L3. In one or more embodiments, the substrate 305 generally comprises a plurality of channels 330 of a honeycomb substrate, of which only one channel is shown in cross-section for clarity. The first material forming an upstream zone 310 extends from the inlet end 315 of the substrate 305 through less than the entire axial length L3 of the substrate 305. The length of the upstream zone 310 is denoted as upstream zone length 310*a* in FIG. 4. The second material forming downstream zone 312 extends from the outlet end 320 of the substrate 305 through less than the entire axial length L3 of the substrate 305. The length of the downstream zone 312 is denoted as the downstream zone length 312*a* in FIG. 4. In one or more embodiments, as illustrated in FIG. 4, the first material forming the upstream zone 310 is directly abutting the second material forming the downstream zone 312. It will be appreciated by one of skill in the art that in some embodiments, the location of the first material and the second material can be reversed, such that the second material forms an upstream zone on the substrate and the first material forms a downstream zone on the substrate.

Figure 5:
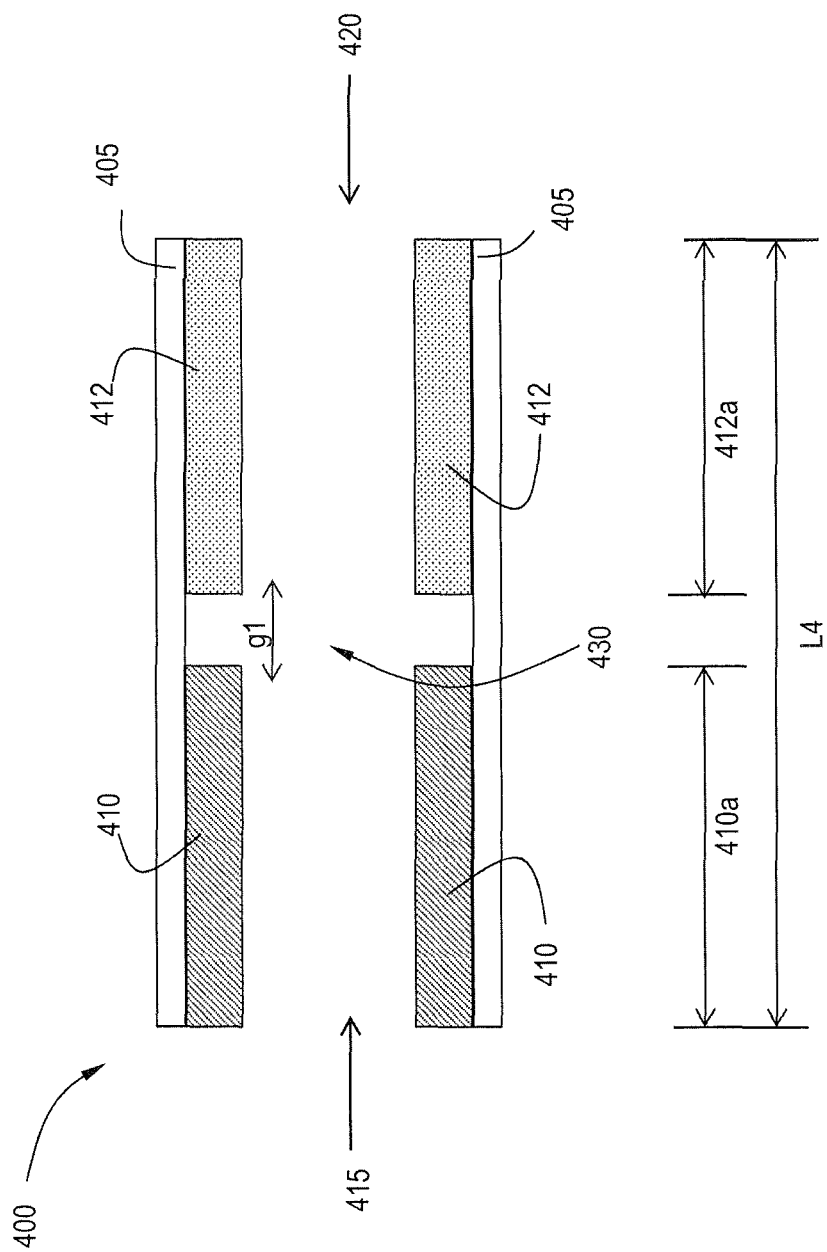
FIG. 5 shows partial cross-sectional views of catalytic article systems according to one or more embodiments.

In further embodiments, as illustrated in FIG. 5, there may be gaps between the first material and the second material. Referring to FIG. 5, an exemplary embodiment of an axially zoned catalyst 400 is shown. The first material forms an upstream zone 410, which is located upstream of the second material which forms a downstream zone 412 on a common substrate 405. The substrate 405 has an inlet end 415 and an outlet end 420 defining an axial length L4. In one or more embodiments, the substrate 405 generally comprises a plurality of channels 430 of a honeycomb substrate, of which only one channel is shown in cross-section for clarity. As illustrated, there is a gap, g1, between the first material forming the upstream zone 410 and the second material forming the downstream zone 412. The first material forming an upstream zone 410 extends from the inlet end 415 of the substrate 405 through less than the entire axial length L4 of the substrate 405. The length of the upstream zone 410 is denoted as upstream zone length 410a in FIG. 5. The second material forming downstream zone 412 extends from the outlet end 420 of the substrate 405 through less than the entire axial length L4 of the substrate 405. The length of the downstream zone 412 is denoted as the downstream zone length 412a in FIG. 5. It will be appreciated by one of skill in the art that in some embodiments, the location of the first material and the second material can be reversed, such that the second material forms an upstream zone on the substrate and the first material forms a downstream zone on the substrate.

Figure 6:
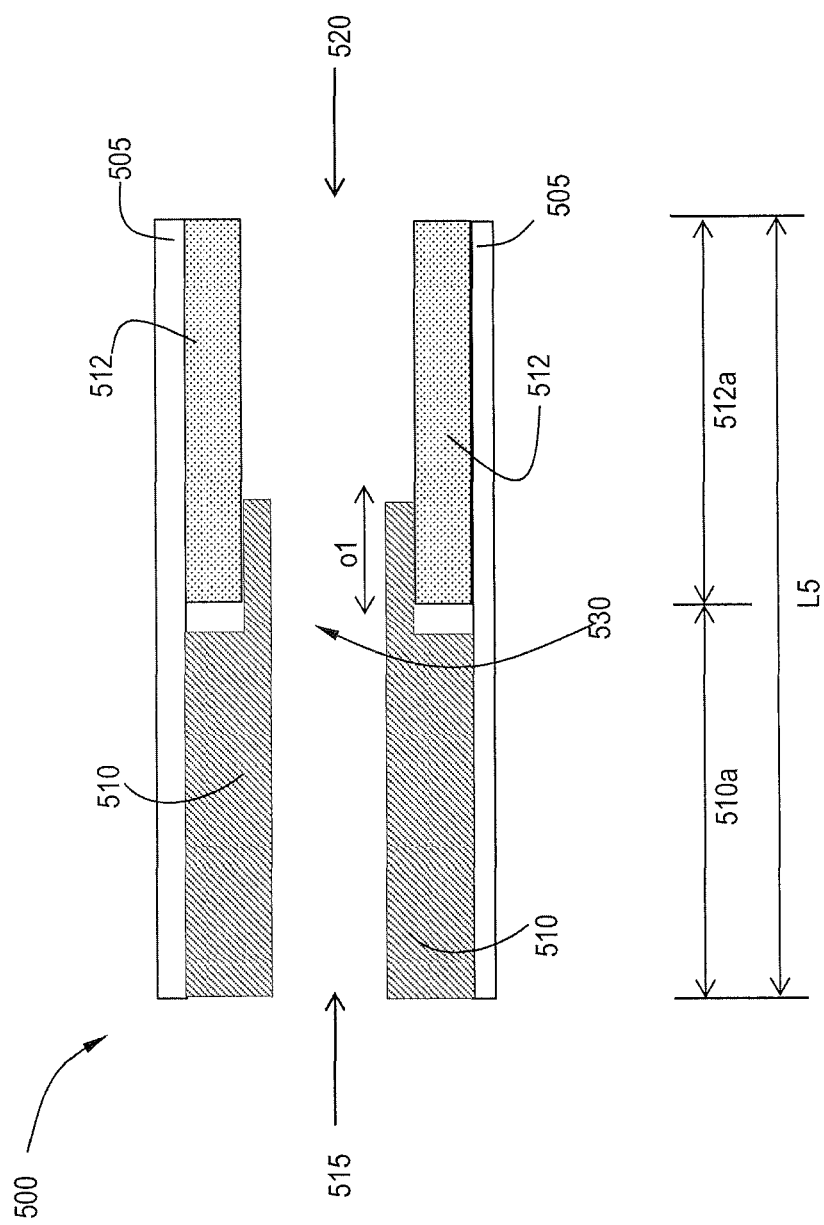
FIG. 6 shows partial cross-sectional views of catalytic article systems according to one or more embodiments.
Figure 7:
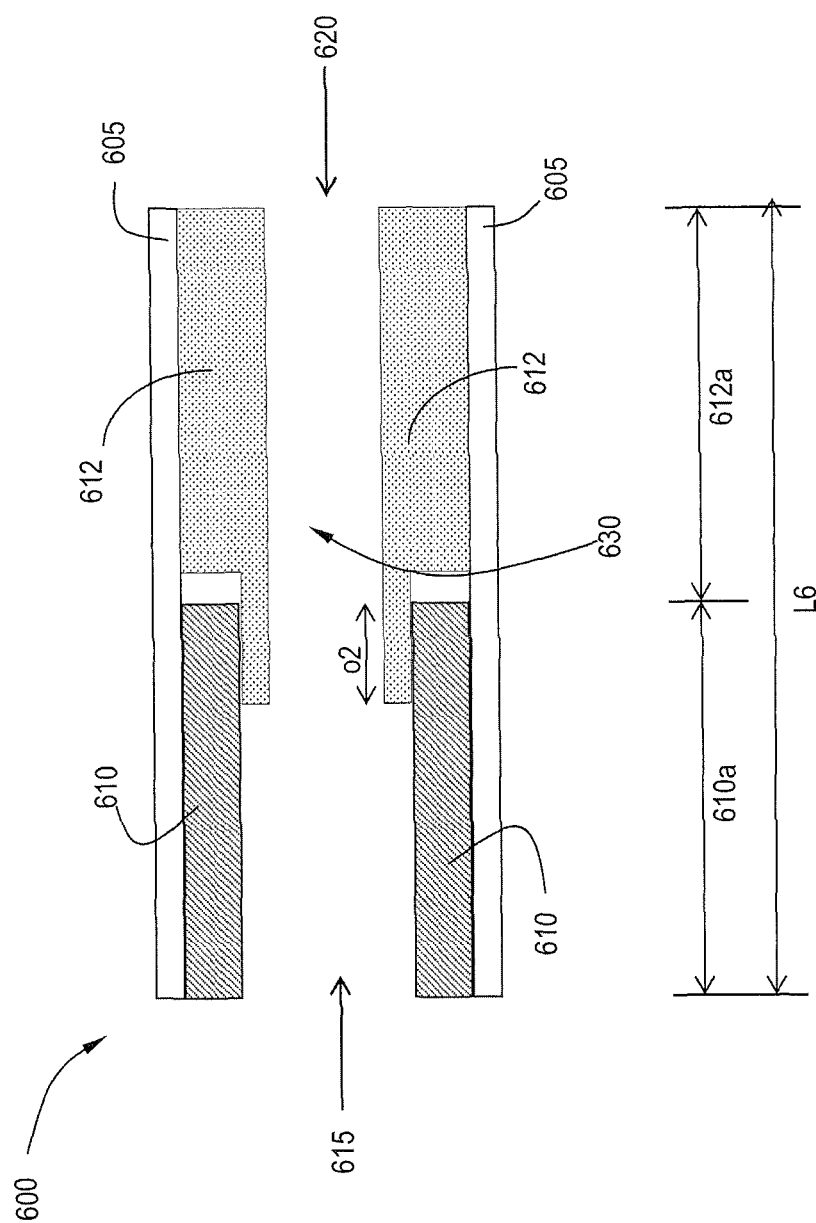
FIG. 7 shows partial cross-sectional views of catalytic article systems according to one or more embodiments.

In other embodiments, as illustrated in FIGS. 6-7, it will be appreciated by one skilled in the art that the first material and the second material of catalyst can be at least partially overlapping. For example, referring to FIG. 6, an exemplary embodiment of an axially zoned catalyst 500 is shown. In one or more embodiments the first material forming the upstream zone 510 is at least partially overlapping the second material forming the downstream zone 512. More specifically, the first material forming the upstream zone 510 is located upstream of the second material forming the downstream zone 512 on a common substrate 505. The substrate 505 has an inlet end 515 and an outlet end 520 defining an axial length L5. In one or more embodiments, the substrate 505 generally comprises a plurality of channels 530 of a honeycomb substrate, of which only one channel is shown in cross-section for clarity. The first material forming the upstream zone 510 extends from the inlet end 515 of the substrate 505 through less than the entire axial length L5 of the substrate 505. The length of the upstream zone 510 is denoted as upstream zone length 510a in FIG. 6. The second material forming the downstream zone 512 extends from the outlet end 520 of the substrate 505 through less than the entire axial length L5 of the substrate 505. The length of the downstream zone 512 is denoted as the downstream zone length 512a in FIG. 6. As illustrated, the first material forming the upstream zone 510 is at least partially overlapping the second material forming the downstream zone 512. The length of the overlap, o1, can vary. It will be appreciated by one of skill in the art that in some embodiments, the location of the first material and the second material can be reversed, such that the second material forms an upstream zone on the substrate and the first material forms a downstream zone on the substrate.

In other embodiments, as illustrated in FIG. 7, the second material forming the downstream zone 612 is at least partially overlapping the first material forming the upstream zone 610. More specifically, referring to FIG. 7, an exemplary embodiment of an axially zoned catalyst 600 is shown. The first material forming the upstream zone 610 is located upstream of the second material forming the downstream zone 612 on a common substrate 605. The substrate 605 has an inlet end 615 and an outlet end 620 defining an axial length L6. In one or more embodiments, the substrate 605 generally comprises a plurality of channels 630 of a honeycomb substrate, of which only one channel is shown in cross-section for clarity. The first material forming the upstream zone 610 extends from the inlet end 615 of the substrate 605 through less than the entire axial length L6 of the substrate 605. The length of the upstream zone 610 is denoted as upstream zone length 610a in FIG. 7. The second material forming the downstream zone 612 extends from the outlet end 620 of the substrate 605 through less than the entire axial length L6 of the substrate 605. The length of the downstream zone 612 is denoted as the downstream zone length 612a in FIG. 7. As illustrated, the second material forming the downstream zone 612 is at least partially overlapping the first material forming the upstream zone 610. The length of the overlap, o2, can vary. It will be appreciated by one of skill in the art that in some embodiments, the location of the first material and the second material can be reversed, such that the second material forms an upstream zone on the substrate and the first material forms a downstream zone on the substrate.

In one or more embodiments, the catalyst is on a wall flow filter. In such embodiments, the first material can be coated on the inlet passages of the wall flow filter, and the second material can be coated on the outlet passages of the wall flow filter. It will be appreciated by one of skill in the art that in some embodiments, the location of the first material and the second material can be reversed, such that the second material can be coated on the inlet passages of the wall flow filter and the first material can be coated on the outlet passages of the wall flow filter.

Exhaust Gas Treatment System

A further aspect of the present invention is directed to an exhaust gas treatment system. In one or more embodiments, an exhaust gas treatment system comprises a gasoline engine, particularly a stoichiometric gasoline engine and the catalyst of one or more embodiments downstream from the engine. In one or more embodiments, the gasoline engine produces exhaust gas temperatures of 850° C. and higher. In other embodiments, the catalyst according to one or more embodiments is exposed to temperatures in excess of 800° C. and lean and rich exhaust gas.

Figure 8:
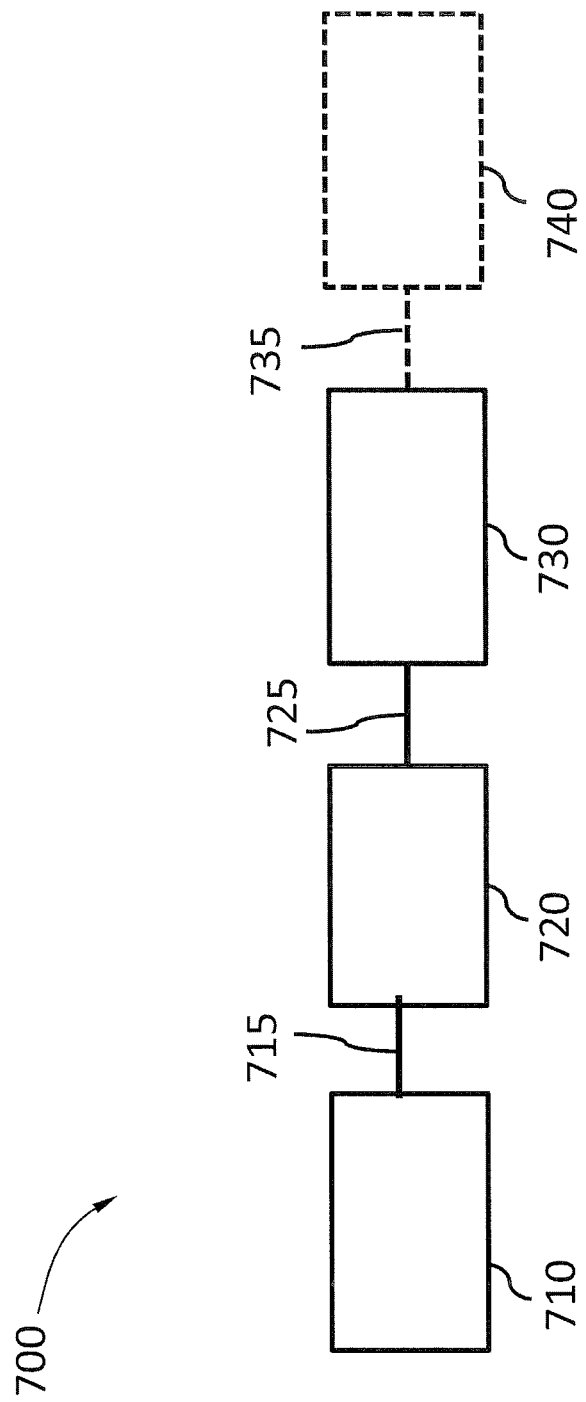
FIG. 8 is a diagram of an exemplary exhaust gas system configuration used in gasoline engines according to one or more embodiments of the invention.

Referring to FIG. 8, the engine exhaust system of one or more embodiments can further comprise a three-way conversion (TWC) catalyst downstream from the engine and upstream from the catalyst of one or more embodiments. The TWC catalyst is effective to convert carbon monoxide, hydrocarbons, and oxides of nitrogen. Specifically, FIG. 8 shows an engine exhaust system 700 comprising a TWC catalyst 720 downstream from a gasoline engine 710 via an exhaust conduit 715, and catalyst 730 according to one or more embodiments of the present invention downstream from the TWC catalyst 720 via an exhaust conduit 725.

In one or more embodiments, the engine exhaust system 700 further comprises an optional catalyst 740 (e.g. ammonia oxidation catalyst, CO oxidation catalyst, SCR catalyst, etc.) disposed downstream of the catalyst 730 according to one or more embodiments of the present invention via an exhaust conduit 735. In one particular embodiment, optional catalyst 740 is an SCR catalyst, such that an exhaust gas treatment system is provided, comprising a gasoline engine 710 (e.g., a stoichiometric gasoline engine), a TWC catalyst 720 downstream from the engine, the catalyst 730 according to one or more embodiments of the present invention downstream from TWC catalyst 720, and an SCR catalyst downstream from catalyst 730 (the SCR catalyst comprising, for example, copper and a second molecular sieve having a maximum ring size of eight tetrahedral atoms and a double six-ring (d6r) unit, wherein copper is present in an amount of about 0.01% to about 2% by weight on an oxide basis based on the weight of the second molecular sieve, and wherein the SCR is effective to catalyze the selective catalytic reduction of nitrogen oxides in the presence of ammonia under stoichiometric engine operating conditions). It will be appreciated by one skilled in the art that one or more of the catalyst 730 according to one or more embodiments of the present invention, the TWC catalyst 720, and the optional catalyst 740 can be on a filter. In other embodiment, the engine exhaust gas treatment system further comprises a wall flow filter or a particulate filter.

In one or more embodiments, the catalyst comprising the first material and the second material is downstream of a three-way conversion (TWC) catalyst. In one or more embodiments there are one or more additional catalytic materials located between the catalyst comprising the first material and the second material and the TWC catalyst. In some embodiments, the catalyst comprising the first material and the second material is immediately downstream of the TWC catalyst. As used herein, the term "immediately downstream" refers to the relative direction according to the flow of an engine exhaust gas stream from an engine towards a tailpipe. Immediately downstream means that there is no other catalytic material between the catalyst comprising the first material and the second material and the TWC catalyst.

In one or more embodiments, an engine exhaust system comprises a three-way conversion (TWC) catalyst mounted in a position near the engine (in a close-coupled position, CC), and a second catalyst according to the current invention in a position either closely next to the TWC catalyst (in a second close-coupled position, CC2) or underneath the vehicle body (in an underfloor position, UF). In one or more embodiments, there are no specific requirements with respect to the TWC catalyst; any TWC catalyst known in the art can be utilized. In one or more embodiments, the TWC catalyst comprises a platinum group metal supported on an oxygen storage component and/or a refractory metal oxide support, and, optionally, an additional platinum group metal component supported on a second refractory metal oxide support or a second oxygen storage component.

Examples of suitable oxygen storage components for the TWC catalyst comprise the rare earth oxides, particularly ceria. The OSC can also comprise one or more of lanthana, praseodymia, neodymia, niobia, europia, samaria, ytterbia, yttria, zirconia, and mixtures thereof in addition to ceria. The rare earth oxide may be in bulk (e.g. particulate) form. The oxygen storage component can include cerium oxide (ceria, $CeO_2$) in a form that exhibits oxygen storage properties. The lattice oxygen of ceria can react with carbon monoxide, hydrogen, or hydrocarbons under rich A/F conditions. In one or more embodiments, the oxygen storage component for the TWC catalyst comprises a ceria-zirconia composite or a rare earth-stabilized ceria-zirconia.

In one or more embodiments, the refractory metal oxide supports for the TWC catalyst independently comprise a compound that is activated, stabilized, or both, selected from the group consisting of alumina, zirconia, alumina-zirconia, lanthana-alumina, lanthana-zirconia-alumina, alumina-chromia, ceria, alumina-ceria, and combinations thereof.

In one or more embodiments, the platinum group metal component of the TWC catalyst is selected from platinum, palladium, rhodium, or mixtures thereof. In specific embodiments, the platinum group metal component of the TWC catalyst comprises palladium. Generally, there are no specific restrictions as far as the palladium content of the TWC catalyst is concerned.

In one or more embodiments, the TWC catalyst does not comprise an additional platinum group metal other than palladium. In other embodiments, the TWC catalyst comprises an additional platinum group metal. In one or more embodiments, when present, the additional platinum group metal is selected from platinum, rhodium, and mixtures thereof. In specific embodiments, the additional platinum group metal component comprises rhodium. In specific embodiments, the TWC catalyst contains a platinum group metal selected from palladium and rhodium. Generally there are no specific restrictions as far as the rhodium content of the TWC catalyst is concerned. In one or more specific embodiments, the TWC catalyst comprises a mixture of palladium and rhodium. In other embodiments, the TWC catalyst comprises a mixture of platinum, palladium, and rhodium.

In a further aspect, provided is an engine exhaust gas treatment system comprising a gasoline engine, particularly a stoichiometric gasoline engine, and a selective catalytic reduction (SCR) catalyst downstream from the engine. In one or more embodiments, the SCR catalyst comprises copper and a second molecular sieve having a maximum ring size of eight tetrahedral atoms and a double six-ring (d6r) unit.

In one or more embodiments, the copper is present in an amount in the range of 0.01% to 2% by weight on an oxide basis based on the weight of the metal-promoted molecular sieve. The SCR catalyst is effective to catalyze the selective catalytic reduction of nitrogen oxides in the presence of ammonia under stoichiometric engine operating conditions. In specific embodiments, the molecular sieve comprises a molecular sieve of framework type CHA. In other specific embodiments, the molecular sieve is selected from SSZ-13, SSZ-62, chabazite, zeolite K-G, Linde D, Linde R, LZ-218, LZ-235, LZ-236, ZK-14, SAPO-34, SAPO-44, SAPO-47, ZYT-6, and Ti-SAPO-34. In very specific embodiments, the molecular sieve is selected from SSZ-13 has a molar ratio of silica to alumina in the range of 10 and 75. In yet further specific embodiments, after exposure to lean and rich exhaust gas at temperatures in excess of 800° C. for more than 5 hours, the molecular sieve has a surface area greater than 400 $m^2/g$.

In one or more embodiments, the exhaust gas treatment system further comprises an ammonia oxidation (AMOx) catalyst downstream of the catalyst of one more embodiments comprising the first material and the second material. The ammonia oxidation catalyst may be provided downstream of the catalyst of one more embodiments comprising the first material and the second material to remove any slipped ammonia from the exhaust gas treatment system. In one or more embodiments, the catalyst of one more embodiments comprising the first material and the second material is on a substrate having an inlet and an outlet, and includes an ammonia oxidation (AMOx) catalyst at the outlet. In specific embodiments, the AMOx catalyst may comprise a platinum group metal such as platinum, palladium, rhodium, or combinations thereof. In one or more embodiments, the AMOx catalyst may comprise a bottom coat with PGM and a top coat with SCR functionality.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. Thus, the first catalyst can be the SCR catalyst, and the second catalyst can be an AMOx catalyst and/or SCR+AMOx integrated catalyst, optionally comprising a zeolite.

AMOx catalyst composition(s) can be coated on a flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present):

TABLE 1

| Catalyst A | Catalyst B | Catalyst C | Catalyst D | Catalyst E |
|---|---|---|---|---|
| TWC | Catalyst comprising first material and second material (close-coupled) | — | — | — |
| TWC | Catalyst comprising first material and second material (underfloor) | — | — | — |
| TWC | NO$_x$ storage catalyst | Catalyst comprising first material and second material | — | — |
| TWC | NO$_x$ storage catalyst | Catalyst comprising first material and second material | Optional SCR | Optional AMOx |

Method of Treating Engine Exhaust

Another aspect of the present invention is directed to a method of treating the exhaust gas stream of a gasoline engine, particularly a stoichiometric gasoline engine. In one or more embodiments, a method for treatment of an engine exhaust gas stream of a gasoline engine comprises placing the catalyst according to one or more embodiments comprising a first material and a second material downstream from a gasoline engine and flowing the engine exhaust gas stream over the catalyst. In one or more embodiments, the method further comprising placing a three-way conversion (TWC) catalyst downstream from the engine and upstream from the catalyst according to one or more embodiments and directing the exhaust gas stream through the TWC catalyst and then through the catalyst according to one or more embodiments.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Comparative 3.2% CuO Cu-SSZ-13: To a vessel equipped with a mechanical agitator and steam heating was added a suspension of NW-exchanged SSZ-13 with a silica-to-alumina ratio of 30. The vessel contents were heated to 60° C. under agitation. A solution of copper acetate was added to the reaction mixture. The solid was filtered, washed with deionized water, and air-dried. The resulting Cu-SSZ-13 was calcined in air at 550° C. for 6 hours. The obtained product has a copper content of 3.2 wt. %, on the basis of CuO as determined by ICP analysis.

Example 2—Comparative 2.4% CuO Cu-SSZ-13: Following the preparation procedure of Example 1, Cu-SSZ-13 with a copper content of 2.4 wt. %, on the basis of CuO as determined by ICP analysis, was obtained.

Example 3

1.7% CuO Cu-SSZ-13: Following the preparation procedure of Example 1, Cu-SSZ-13 with a copper content of 1.7 wt. %, on the basis of CuO as determined by ICP analysis, was obtained.

Example 4

1.1% CuO Cu-SSZ-13: Following the preparation procedure of Example 1, Cu-SSZ-13 with a copper content of 1.1 wt. %, on the basis of CuO as determined by ICP analysis, was obtained.

Example 5

0.6% CuO Cu-SSZ-13: Following the preparation procedure of Example 1, Cu-SSZ-13 with a copper content of 0.6 wt. %, on the basis of CuO as determined by ICP analysis, was obtained.

Example 6

1.7% CuO CuSAPO-34: Following the preparation procedure of Example 3 and NW-SAPO-34 as the precursor, CuSAPO-34 of a copper content of 1.7 wt. %, on the basis of CuO as determined by ICP analysis, was obtained.

Example 7

5% NiO/CeO$_2$: A solution of nickel nitrate was impregnated onto a powder of ceria, with a surface area of 180 m$^2$/g, by the incipient wetness impregnation technique to reach a loading of 5.0 wt. % on the basis of NiO. The resulting wet powder was dried at 120° C. for 5 hours and calcined at 550° C. for 2 hours.
BET surface areas: Fresh: 112 m$^2$/g; aged in air at 850° C. for 5 hours: 41 m$^2$/g Example 8

5% NiO-1% CuO/CeO$_2$: A mixed solution of nickel nitrate and copper nitrated was impregnated onto a powder of ceria, with a surface area of 180 m$^2$/g, by the incipient wetness impregnation technique to reach a loading of 5.0 wt. % on the basis of NiO and a loading of 1.0 wt. % on the basis of CuO. The resulting wet powder was dried at 120° C. for 5 hours and calcined at 550° C. for 2 hours. BET surface areas: Fresh: 112 m$^2$/g; aged in air at 850° C. for 5 hours: 37 m$^2$/g Example 9

5% Fe$_2$O$_3$/OSC: A solution of iron nitrate was impregnated onto a powder of stabilized ceria/zirconia (weight ratio CeO$_2$/ZrO$_2$/La$_2$O$_3$=40%/50%/10%), with a surface area of 78 m²/g, by the incipient wetness impregnation technique to reach a loading of 5.0 wt. % on the basis of $Fe_2O_3$ and a loading of 1.0 wt. % on the basis of CuO. The resulting wet powder was dried at 120° C. for 5 hours and calcined at 550° C. for 2 hours.

BET surface areas: Fresh: 74 m²/g; aged in air at 850° C. for 5 hours: 38 m²/g

Example 10

Base metal oxide powders containing oxides of iron (Fe), copper (Cu), or nickel (Ni) deposited onto various supports ($ZrO_2$, $CeO_2$—$ZrO_2$ mixed oxides with 30% and 65% $CeO_2$, and $CeO_2$) were prepared by conventional incipient wetness impregnation methods, using a nitrate solution of the corresponding base metal oxide (BMO) as the precursor. The BMO loading was controlled at 5% on a weight basis. Samples were aged at 900° C. for 12 hours in air with 10% water.

Figure 10:
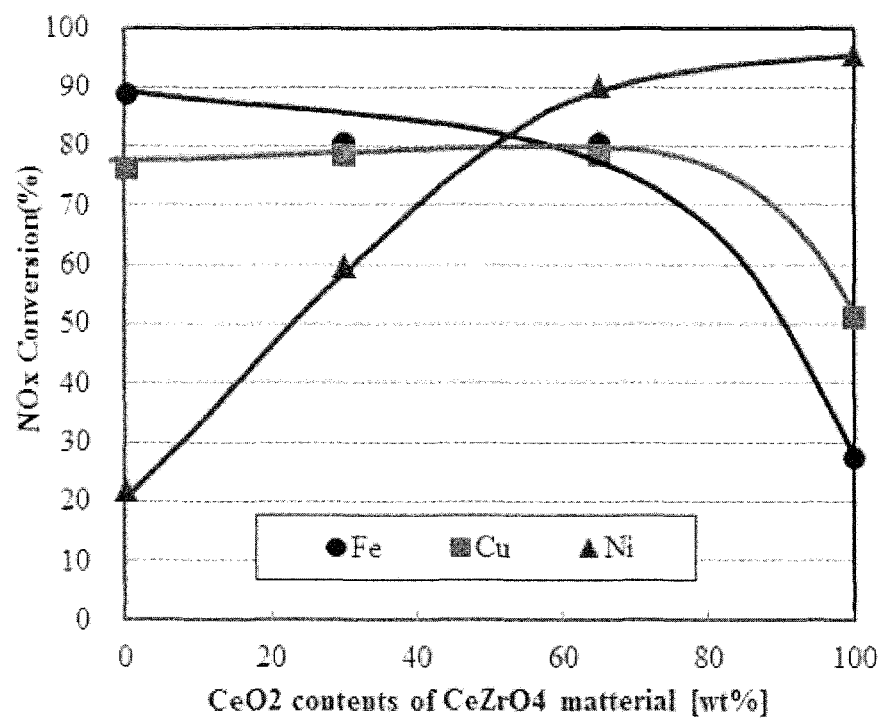
FIG. 10 is a line graph showing de-NO$_x$ performance of catalyst compositions having a base metal oxide supported on different supports with varying CeO$_2$ content.

FIG. 10 plots NO conversion of CO—NO reaction of the supported BMO powder catalysts after being aged at 900° C. The samples were tested in a model gas reactor equipped with an ANELVA mass analyzer (conditions: NO 0.100%, CO 0.450%, $C_5H_{12}$ 0.017%, $H_2O$ 1.000%, $NH_3$ 0.020%, balance gas He, evaluation temperature 400° C., total flow rate 300 cc/min, lambda 0.704, sample weight 50 mg). The nickel-based catalysts afforded desired NO conversions in the presence of $CeO_2$-enriched supports. This observation is in line with the fact that Ni on $CeO_2$ has a better Ni reducibility in comparison with Ni on $ZrO_2$ or Ni on $CeO_2$—$ZrO_2$. In contrast, Fe and Cu catalysts displayed higher NO activities on supports of a lower $CeO_2$ content.

Example 11

Preparation of an upstream TWC catalyst with a three-layer washcoat architecture: Three washcoat slurries were prepared, a bottom washcoat, a middle washcoat, and a top washcoat. The bottom washcoat was coated onto a 4.66"×2.87" cylinder monolith substrate having a cell density of 600 cpsi (number of cells per square inch) and a wall thickness of 3.5 mil (about 100 μm), with a washcoat loading of 1.67 g/in³. The bottom washcoat contained 2.4 wt. % palladium, 36.8 wt. % of a high surface area gamma-alumina (BET surface area: 150 m²/g), 22.9 wt. % cerium oxide, 25.9 wt. % zirconium oxide, 3.9 wt. % barium oxide, and 8.1 wt. % of rare earth metal oxides as stabilizers. A middle washcoat was coated over the bottom washcoat, with a washcoat loading of 1.24 g/in³, containing 0.6 wt. % rhodium, 30.0 wt. % of a high surface area gamma-alumina (BET surface area: 150 m²/g), 24.1 wt. % cerium oxide, 38.2 wt. % zirconium oxide, and 7.1 wt. % of rare earth metal oxides as stabilizers. A top coat was coated over the middle washcoat, with a washcoat loading of 1.21 g/in³, containing 5.6 wt. % palladium, 51.5 wt. % of a high surface area gamma-alumina (BET surface area: 150 m²/g), 11.1 wt. % cerium oxide, 12.8 wt. % zirconium oxide, 6.6 wt. % barium oxide, and 12.4 wt. % of rare earth metal oxides as stabilizers.

Example 12—Comparative

A slurry of Comparative Example 1 was prepared by mixing 3.2% CuO Cu-SSZ-13, as described above, with deionized water. To the slurry was added a solution of zirconium acetate containing 29% $ZrO_2$. The slurry was coated onto 4.66"×2.87" cylinder monolith substrates, having a cell density of 600 cpsi (number of cells per square inch) and a wall thickness of 3.5 mil, to reach a target washcoat loading of 2.73 g/in³. The coated catalysts were flashed dried on a flow-through drier at 200° C. and calcined at 550° C. for 2 hours.

Example 13

Following the coating procedure of Comparative Example 12, a monolith catalyst of Example 3 (1.7% CuO Cu-SSZ-13) was prepared.

Example 14

Following the coating procedure of Comparative Example 12, a monolith catalyst of Example 6 (1.7% CuO SAPO-34) was prepared.

Example 15

This example describes the preparation of a downstream TWC catalyst, free of any PGM, comprising a two-layer washcoat architecture. The bottom coat, with a washcoat loading of 1.58 g/in³, contained 1.20 g/in³ of 5% NiO-1% $CuO/CeO_2$ (Example 8), 0.30 g/in³ of 5% $Fe_2O_3$/OSC (Example 9), and 0.08 g/in³ of $ZrO_2$ in the form of zirconium acetate. The top coat, with a washcoat loading of 2.49 g/in³, contained 2.49 g/in³ of 1.7% CuO SAPO-34 (Example 6), and 0.09 g/in³ of $ZrO_2$ in the form of zirconium acetate. The slurries were milled to reduce the average particle size and then coated onto 4.66"×2.87" cylinder monolith substrates, having a cell density of 600 cpsi (number of cells per square inch) and a wall thickness of 3.5 mil, to reach a target washcoat loading of 2.73 g/in³. The coated catalysts were flash dried on a flow-through drier at 200° C. and calcined at 550° C. for 2 hours.

Aging and Testing

Powder samples were aged in a horizontal tube furnace fit with a quartz tube. Aging was carried out at 850° C. for 5 hours under either a flow of air (air aging) or cyclic lean/rich conditions (lean/rich aging) in the presence of 10% steam. In the case of the lean/rich aging, the aging cycle includes 5 minutes of air, 5 minutes of $N_2$, 5 minutes of 4% $H_2$ balanced with $N_2$, and 5 minutes of $N_2$; such a cycle is repeated till the desired aging duration is reached.

The monolith catalysts were individually mounted in steel converter cans and aged in an exhaust line of a gasoline engine under fuel-cut aging cycles. The upstream TWC catalyst of Example 11 was aged at a maximum bed temperature of 950° C. for 50 hours. The downstream PGM-free catalysts Examples 12-15, were aged at a maximum bed temperature of 840° C. for 10 hours. The aged catalysts were tested on a 1.8 L gasoline engine operating US FTP-75 driving cycles following certified procedures and tolerances.

Figure 9:
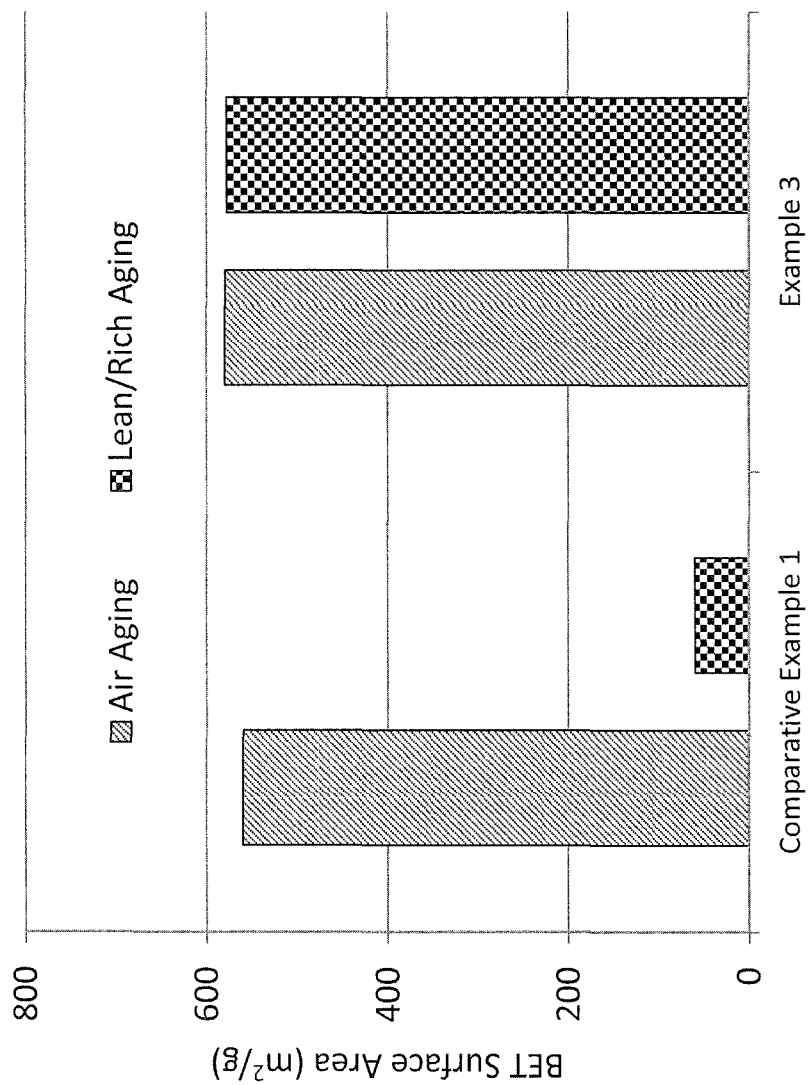
FIG. 9 is a bar graph showing BET surface areas after air aging and lean/rich aging for samples prepared according to the Examples.

FIG. 9 provides a comparison of BET surface areas between Comparative Example 1 and Example 3 after air aging and lean/rich aging at 850° C. for 5 hours. Example 1 contained 3.2% CuO, a loading typical for diesel applications. Example 3 contained 1.7% CuO which was significantly lower than Example 1. Under air aging conditions, both examples retained a BET surface area of >550 m²/g. However, under lean/rich aging conditions, a significant deterioration in BET surface area was observed for Example 1. In contrast, Example 3 retained a surface area comparable to the air-aged sample under lean/rich aging conditions. Table 1 summarizes BET surface areas of Cu-SSZ-13 and CuSAPO-34 of different CuO loadings after lean/rich aging. It is clearly shown that the lower CuO loadings, for instance 0.6-1.7 wt. %, are critical for the high thermal stability under lean/rich aging conditions which are more relevant to TWC applications.

TABLE 2

| | Zeolite | CuO Loading (wt. %)[a] | BET Surface Area After Aging (m$^2$/g)[b] |
|---|---|---|---|
| Comp. Ex. 1 | SSZ-13 | 3.2 | 65 |
| Comp. Ex. 2 | SSZ-13 | 2.4 | 278 |
| Ex. 3 | SSZ-13 | 1.7 | 578 |
| Ex. 4 | SSZ-13 | 1.1 | 583 |
| Ex. 5 | SSZ-13 | 0.6 | 586 |
| Ex. 6 | SAPO-34 | 1.7 | 569 |

[a]Cu content on the basis of CuO determined by ICP.
[b]Lean/rich aging at 850° C. for 5 hours.

Table 2 provides conversions of NO$_x$, HC and CO of the downstream PGM-free catalysts relative to mid-bed emissions during FTP-75 tests. All emission systems contained the universal upstream TWC catalyst of Example 11 in a first close-coupled position (CC1), and a downstream PGM-free catalyst either in a second close-coupled position (CC2) or in an underfloor (UF) position. Systems 1-4 were tested in the CC1+CC2 configuration. System 1 utilized the catalyst of Comparative Example 12 with 3.2% CuO Cu-SSZ-13 as the downstream catalyst, which gave a 16.9% conversion of NO$_x$. In comparison, Systems 2 and 3 utilized the catalyst of Example 13 (formulated with 1.7% CuO Cu-SSZ-13) and Example 14 (formulated with 1.7% CuO CuSAPO-34), respectively, which improved the NO$_x$ conversion to 34.2-39.2%. The improvement in the NO$_x$ conversion is in good agreement with the enhanced thermal stability of the lower CuO zeolites under lean/rich aging conditions. System 4 utilized the catalyst of Example 15, which was formulated with 1.7% CuO CuSAPO-34 in the bottom coat as well as 5% NiO-1% CuO/CeO$_2$ and 5% Fe$_2$O$_3$/OSC in the top coat, as the downstream catalyst. In comparison with System 3, System 4 not only improved the NO$_x$ conversion to 46.6%, but also increased the HC and CO conversions to 18.8% and 51.3%, respectively. Those improvements in performance are presumably attributable to activities of the hydrocarbon steam reforming and water-gas shift reaction of the transition metals supported on ceria and ceria-zirconia materials. System 5 was tested in the CC+UF configuration, placing the downstream catalyst of Example 15 in a position of lower temperature. Compared to System 4, System 5 further improved the NO$_x$ conversion to 67.1% with a marginal loss in the HC and CO conversions. In summary, the catalyst of Example 15 is capable of simultaneously abating NO$_x$, HC and CO with moderate to decent conversions under TWC conditions.

TABLE 3

| System | Upstream Catalyst | Downstream Catalyst | Configuration | HC Conv. (%)[a] | CO Conv. (%)[a] | NO$_x$ Conv. (%)[a] |
|---|---|---|---|---|---|---|
| System 1 | Ex. 11 | Comp. Ex. 12 | Close-coupled | 21.4 | 41.6 | 16.9 |
| System 2 | Ex. 11 | Ex. 13 | Close-coupled | 19.3 | 16.8 | 39.2 |
| System 3 | Ex. 11 | Ex. 14 | Close-coupled | 22.0 | 11.1 | 34.2 |
| System 4 | Ex. 11 | Ex. 15 | Close-coupled | 28.8 | 51.3 | 46.6 |
| System 5 | Ex. 11 | Ex. 15 | Close-coupled + underfloor | 20.4 | 38.0 | 67.1 |

[a]Conversions of the downstream PGM-free catalysts relative to mid-bed emissions during FTP-75 tests.

In this study, a TWC system comprising a CC catalyst with PGM and an UF catalyst without PGM performs well with a conventional stoichiometric gasoline combustion engine and offers the opportunity to reduce PGM usage in the TWC catalyst composition. Furthermore, the CC catalyst operates as a conventional TWC but also generates a certain amount of NH$_3$ under rich conditions, and the generated NH$_3$ is used as the reductant for the SCR reaction on the UF-non-PGM catalyst. The UF catalyst without the PGM also functions as a deNOx catalyst.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyst effective to abate NOx, hydrocarbons and carbon monoxide from a gasoline engine exhaust gas, the catalyst comprising:
    a substrate having a first and second material disposed thereon, wherein the first material is effective to catalyze selective catalytic reduction of nitrogen oxides in the presence of ammonia and the second material is effective to abate hydrocarbons and carbon monoxide;
    wherein one or both of the following are satisfied: a) the first material comprises a molecular sieve promoted with copper or iron in an amount of about 0.01% to about 2% on an oxide basis based on the weight of the molecular sieve; and b) the second material comprises at least one oxide of a metal selected from Ni, Fe, Mn, Co, and Cu on a support selected from an oxide of Ce, Ce—Zr, Zr, Mn, Pr and combinations thereof;
    wherein the first material and the second material are substantially free of a platinum group metal.

2. The catalyst of claim 1, wherein the substrate is a honeycomb substrate and wherein the first material and second material are mixed in a single layer on the substrate.

3. The catalyst of claim 1, wherein the first material is in a first layer and the second material is in a second layer on the substrate.

4. The catalyst of claim 3, wherein the substrate has an axial length and an upstream end and a downstream end, and wherein the first layer is disposed on the upstream end and the second layer is disposed on the downstream end.

5. The catalyst of claim 3, wherein the substrate has an axial length and an upstream end and a downstream end, and wherein the first layer is disposed on the downstream end and the second layer is disposed on the upstream end.

6. The catalyst of claim 3, wherein the first layer is directly on the substrate and the second layer at least partially overlies the first layer.

7. The catalyst of claim 3, wherein the second layer is directly on the substrate and the first layer at least partially overlies the second layer.

8. The catalyst of claim 1, wherein the substrate is a wall flow filter having inlet passages and outlet passages.

9. The catalyst of claim 8, wherein the first material is disposed on the inlet passages and the second material is disposed on the outlet passages.

10. The catalyst of claim 8, wherein the second material is disposed on the inlet passages and the first material is disposed on the outlet passages.

11. The catalyst of claim 1, wherein the molecular sieve is a small pore molecular sieve having a maximum ring size of eight tetrahedral atoms and a double six-ring (d6r) unit.

12. The catalyst of claim 1, wherein the molecular sieve is selected from the group consisting of framework types AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

13. The catalyst of claim 1, wherein the molecular sieve is selected from the group consisting of framework types CHA, AEI, AFX, ERI, KFI, and LEV.

14. The catalyst of claim 1, wherein the molecular sieve is selected from the group consisting of framework types AEI, CHA, and AFX.

15. The catalyst of claim 1, wherein the molecular sieve comprises a molecular sieve of framework type CHA.

16. The catalyst of claim 15, wherein the molecular sieve is selected from SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, and Ti-SAPO-34.

17. The catalyst of claim 16, wherein the molecular sieve is SSZ-13 having a molar ratio of silica to alumina of about 10 to about 75.

18. The catalyst of claim 16, wherein the molecular sieve is promoted with less than about 2% copper by weight on an oxide basis based on the weight of the copper-promoted molecular sieve.

19. The catalyst of claim 16, wherein the molecular sieve is promoted with copper in an amount of about 0.5% to about 2% by weight on an oxide basis based on the weight of the copper-promoted molecular sieve, and wherein in an FTP driving cycle, the catalyst is effective to convert at least about 30% of nitrogen oxides in the exhaust gas by selective catalytic reduction of nitrogen oxides in the presence of ammonia after exposure to fuel-cut engine aging conditions at a temperature of about 850° C. for more than ten hours.

20. The catalyst of claim 1, wherein the second material comprises at least one oxide of a metal selected from Ni, Fe, Mn, Co, and Cu.

21. The catalyst of claim 1, wherein the second material comprises an oxide of Ni.

22. The catalyst of claim 1, wherein the second material comprises an oxide of Ni deposited on a support comprising an oxide of Ce.

23. The catalyst of claim 18, wherein the second material comprises an oxide of Ni deposited on a support comprising an oxide of Ce.

24. The catalyst of claim 23, wherein the first material is in a first layer and the second material is in a second layer, wherein the first layer and second layer are disposed on the substrate in a zoned configuration, and wherein the first layer overlies the second layer.

25. The catalyst of claim 1, wherein the at least one oxide of a metal selected from Ni, Fe, Mn, Co, and Cu is present in an amount of about 0.1 to about 30 wt. %, on an oxide basis based on the weight of the support.

26. The catalyst of claim 25, wherein the at least one oxide of a metal selected from Ni, Fe, Mn, Co, and Cu is present in an amount of about 2 to about 10 wt. %, on an oxide basis based on the weight of the support.

27. An exhaust gas treatment system comprising:
a stoichiometric gasoline engine;
a three-way conversion (TWC) catalyst downstream from the engine, wherein the TWC catalyst is effective to convert carbon monoxide, hydrocarbons and oxides of nitrogen, and wherein the TWC catalyst comprises at least one platinum group metal selected from platinum, palladium and rhodium; and
a second catalyst comprising the catalyst of claim 1 located downstream from the TWC catalyst.

28. The exhaust gas treatment system of claim 27, wherein the TWC catalyst is located in a first close-coupled position downstream of the engine and the second catalyst is located in a second close-coupled position immediately downstream of the TWC catalyst.

29. The exhaust gas treatment system of claim 27, wherein the TWC catalyst is located in a close-coupled position downstream of the engine and the second catalyst is located in an underfloor position downstream of the TWC catalyst.

30. The exhaust gas treatment system of claim 27, wherein the second catalyst is exposed to lean and rich exhaust gas having a temperature in excess of 800° C.

31. The exhaust gas treatment system of claim 27, further comprising:
a selective catalytic reduction (SCR) catalyst downstream from the engine, the SCR catalyst comprising copper and a second molecular sieve having a maximum ring size of eight tetrahedral atoms and a double six-ring (d6r) unit, wherein copper is present in an amount of about 0.01% to about 2% by weight on an oxide basis based on the weight of the second molecular sieve, and wherein the SCR is effective to catalyze the selective catalytic reduction of nitrogen oxides in the presence of ammonia under stoichiometric engine operating conditions.

32. The exhaust gas treatment system of claim 31, wherein the second molecular sieve comprises a molecular sieve of framework type CHA.

33. The exhaust gas treatment system of claim 31, wherein the second molecular sieve is selected from SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, and Ti-SAPO-34.

34. The exhaust gas treatment system of claim 33, wherein the second molecular sieve is SSZ-13 having a molar ratio of silica to alumina of about 10 to about 75.

35. The exhaust gas treatment system of claim 31, wherein the engine produces exhaust gas with a temperature of at least 850° C.

36. The exhaust gas treatment system of claim 35, wherein the second molecular sieve has a surface area greater than 400 m2/g after exposure to the exhaust gas for 2 hours.

37. The exhaust gas treatment system of claim 35, wherein the second molecular sieve has an aged surface area after exposure to the exhaust gas for 2 hours of about 75% of a fresh surface area, wherein the fresh surface area is the surface area of the molecular sieve prior to exposure to the exhaust gas.

38. A method of treating exhaust gas from a stoichiometric gasoline engine, comprising:

contacting the exhaust gas with a three-way catalyst (TWC) catalyst effective to convert carbon monoxide, hydrocarbons and oxides of nitrogen, wherein the TWC catalyst contains a platinum group metal selected from palladium and rhodium and a second catalyst comprising the catalyst of claim 1, wherein the second catalyst is located downstream from the TWC catalyst.

\* \* \* \* \*